(12) United States Patent
Gracia-Tinedo et al.

(10) Patent No.: US 12,541,522 B1
(45) Date of Patent: Feb. 3, 2026

(54) TRANSPARENT DATA MANAGEMENT OF TIERED DATA STREAMS

(71) Applicant: Dell Products L.P., Round Rock, TX (US)

(72) Inventors: Raúl Gracia-Tinedo, Sant Cugat del Valles (ES); Alan Cueva Mora, Cork (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/954,284

(22) Filed: Nov. 20, 2024

(51) Int. Cl.
  *G06F 16/215* (2019.01)
  *G06F 16/22* (2019.01)
  *G06F 16/2455* (2019.01)

(52) U.S. Cl.
  CPC ...... *G06F 16/24568* (2019.01); *G06F 16/215* (2019.01); *G06F 16/2246* (2019.01)

(58) Field of Classification Search
  CPC ............. G06F 16/24568; G06F 16/215; G06F 16/2246; G06F 16/22; G06F 16/24
  See application file for complete search history.

(56) References Cited

U.S. PATENT DOCUMENTS

| | | | |
|---|---|---|---|
| 9,383,937 B1 * | 7/2016 | Frank | G06F 3/0655 |
| 10,552,038 B2 * | 2/2020 | Baldwin | G06F 3/0649 |
| 2009/0187711 A1 * | 7/2009 | Amarendran | G06F 11/1458 |
| | | | 713/153 |
| 2020/0167360 A1 * | 5/2020 | Rath | G06F 16/278 |
| 2020/0167361 A1 * | 5/2020 | Princehouse | G06F 3/0649 |
| 2022/0245034 A1 * | 8/2022 | Nara | G06F 11/1435 |
| 2022/0326878 A1 * | 10/2022 | Paduroiu | G06F 3/0659 |
| 2022/0374417 A1 * | 11/2022 | Danilov | G06F 16/2379 |

FOREIGN PATENT DOCUMENTS

| | | | | |
|---|---|---|---|---|
| KR | 102249005 B1 * | 5/2021 | | G06F 16/125 |

OTHER PUBLICATIONS

KR-102249005-B1 (translated) (Year: 2021).*
Josep Sampe et al., Data-Driven Serverless Functions for Object Storage, 13 pages, 2017.

(Continued)

*Primary Examiner* — Maher N Algibhah
(74) *Attorney, Agent, or Firm* — Chamberlain, Hrdlicka, White, Williams & Aughtry; Aly Z. Dossa

(57) ABSTRACT

A method for managing a stream includes: intercepting a request originated from a streaming storage system that specifies a data tiering operation; analyzing the request based on a policy to obtain an analysis result; identifying, based on the analysis result and function metadata, a first function and a second function that need to process data chunks of the stream before performing the operation; making, based on the identifying, a determination that the first function and second function are available internally; processing, using the first function and based on the policy, the data chunks to obtain the processed data chunks; identifying, using the second function, that the processed data chunks need to be tiered to a first long-term storage; tiering the processed data chunks to the storage; and notifying, once the processed data chunks are tiered to the storage, the streaming storage system that the data tiering operation is completed.

20 Claims, 4 Drawing Sheets

(56) References Cited

OTHER PUBLICATIONS

Eno Thereska et al., IOFlow A Software-Defined Storage Architecture, SOSP '13, 15 pages, 2013.

Ioan Stefanovici et al., sRoute Treating the Storage Stack Like a Network, 14th USENIX Conference on File and Storage Technologies (FAST '16), 17 pages, 2016.

Raul Gracia-Tinedo et al., Crystal Software-Defined Storage for Multi-Tenant Object Stores, 15 pages, 2017.

Raul Gracia-Tinedo et al., Practical Storage-Compute Elasticity for Stream Data Processing, Middleware Industrial Track '23, 7 pages, 2023.

Raul Gracia-Tinedo et al., Pravega: A Tiered Storage System for Data Streams, Middleware '23, 13 pages, 2023.

\* cited by examiner

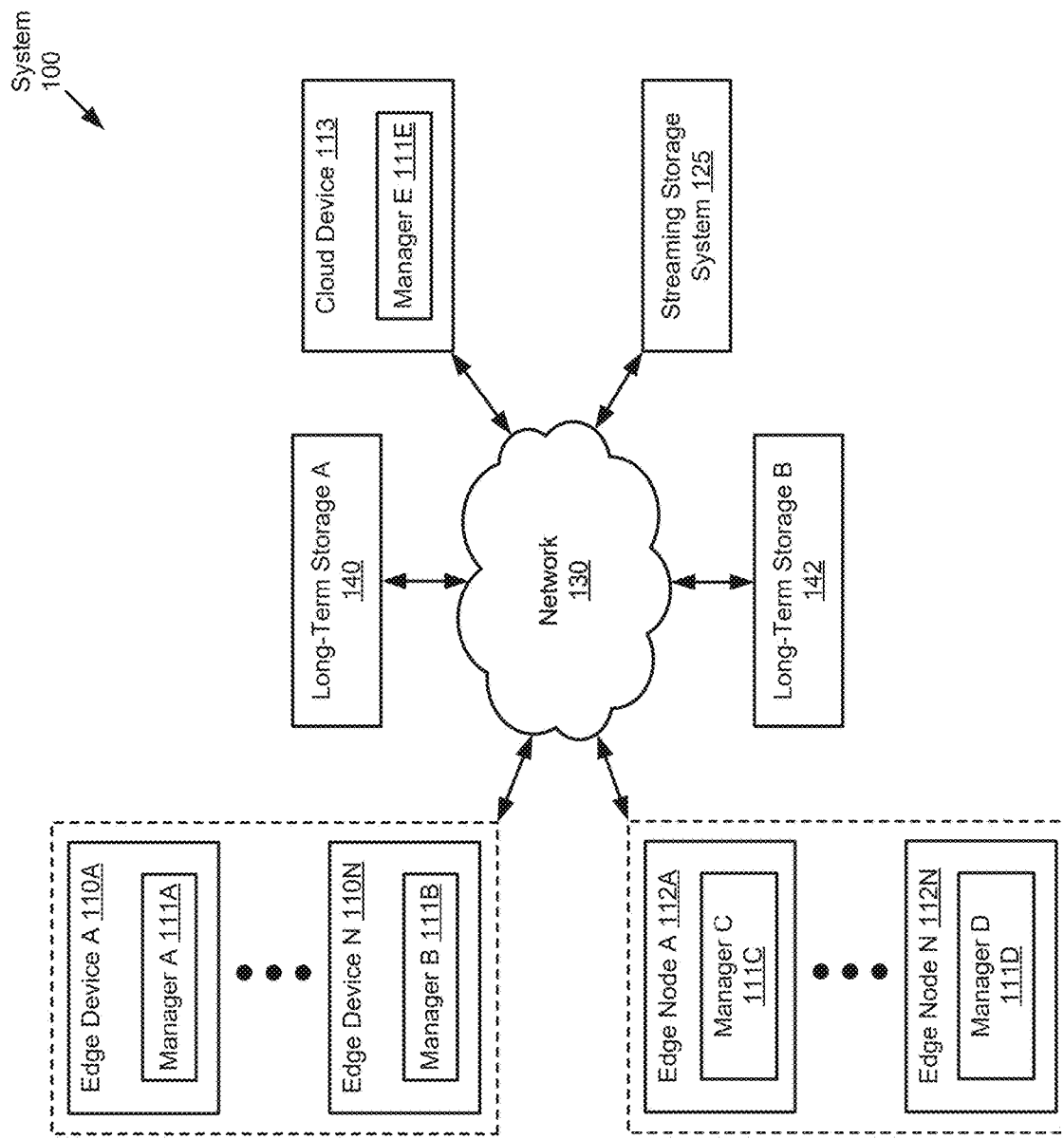
FIG. 1.1

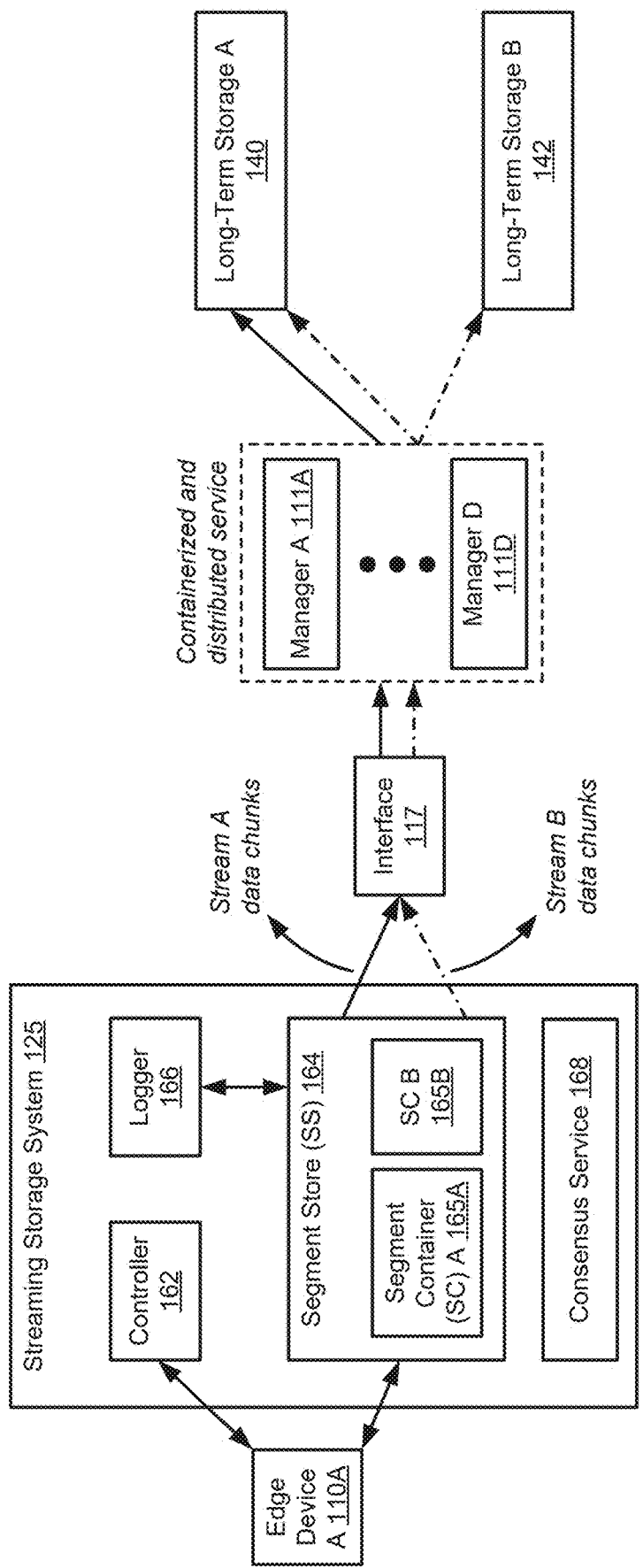
FIG. 1.2

TRANSPARENT DATA MANAGEMENT OF TIERED DATA STREAMS

BACKGROUND

Streaming applications are applications that deal with a large amount of data arriving continuously. In processing streaming application data, the data can arrive late, arrive out of order, and the processing can undergo failure conditions. It can be appreciated that tools designed for previous generations of big data applications may not be ideally suited to process and store streaming application data.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 1.1 shows a diagram of a system in accordance with one or more embodiments disclosed herein.

FIG. 1.2 shows a diagram of the system in accordance with one or more embodiments.

DETAILED DESCRIPTION

Figure 2:
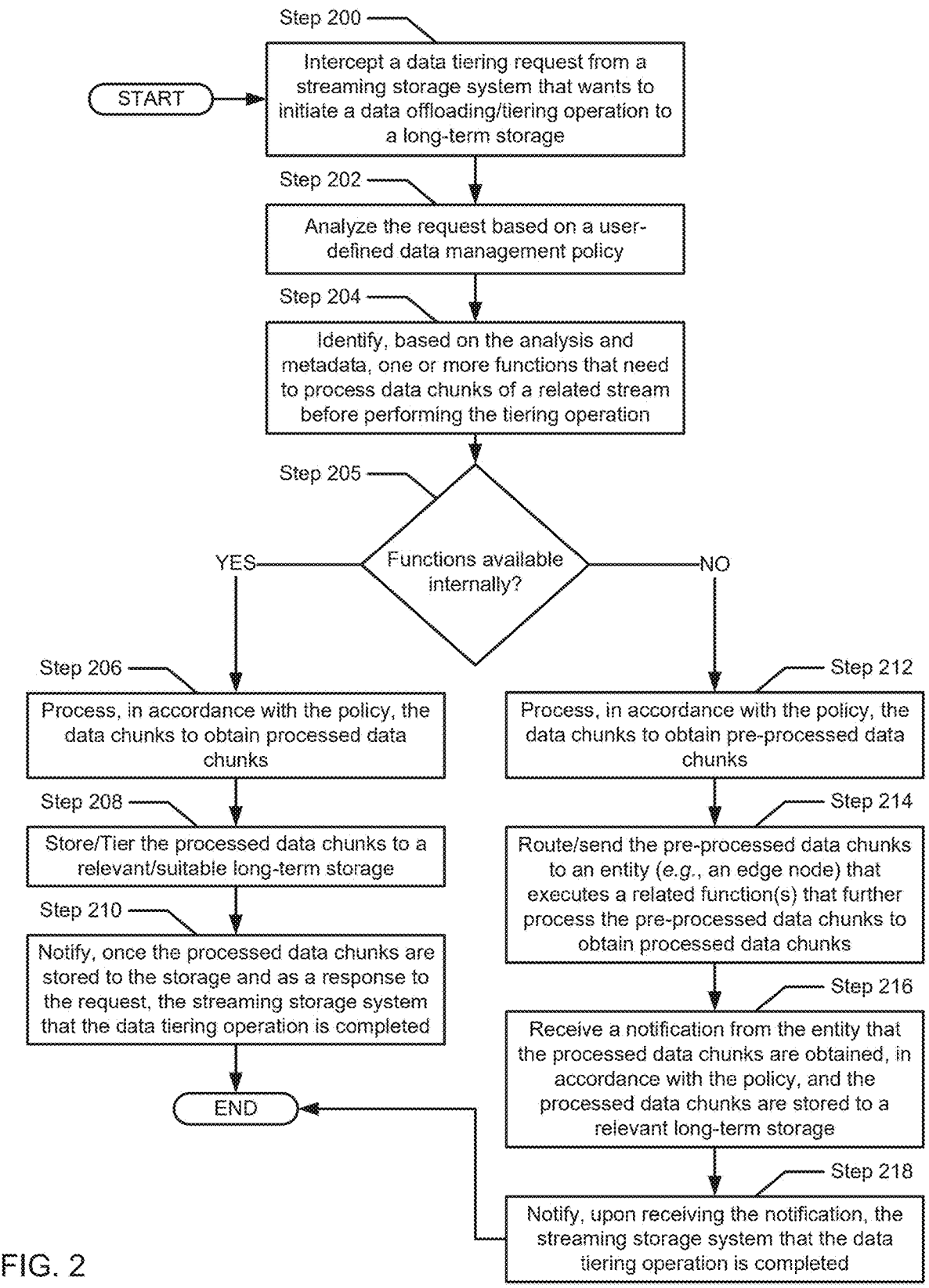
FIG. 2 shows a method for managing a data stream in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In recent years, streaming data management and data analytics have received paramount importance in many critical use cases for various organizations. For example, in an Edge computing use case, an organization may have multiple computing devices (e.g., servers) that address the challenges of streaming data ingestion and real-time (or near real-time) machine learning (ML) based inferences. On private and public cloud infrastructures, streaming systems are becoming a key substrate for managing continuous data sources and analyzing these sources in a streaming fashion, which is a significant aspect, for example, in managing ingested unstructured data in data lakes.

In this sense, the ever-increasing data volumes ingested as data streams has motivated event streaming systems to introduce storage tiering. These systems usually enable administrators to offload stream data to an external storage service/device because of scalability and cost reasons. However, existing systems are limited to simply store data to an external storage device without offering means to route (and/or transform) tiered stream data.

From a different perspective, in recent years, event streaming systems (e.g., streaming storage systems) are emerging as one of the most popular technologies for ingesting and serving data in a streaming fashion. In general, these systems support durability and exactly-once semantics, ensuring data correctness, and allowing for low-latency stream data ingestion and processing. These systems' broad connector ecosystem facilitates easy integration with various analytics engines, enhancing their ability to derive valuable insights from continuous data streams.

The increasing number of storage-demanding streaming use cases has motivated event streaming systems to re-evaluate how stream data is managed and stored. As applications (e.g., Internet of Things (IoT) applications, multimedia streaming applications, etc.) continuously generate vast amounts of data that need to be processed, stored, and/or retrieved efficiently, the pressure on storage devices (or storage infrastructure) grows. To address this issue, streaming systems have adopted stream data tiering (or storage tiering for data streams) as a key feature, which strategically distributes data across different types of storage devices based on their access patterns. As used herein, stream data tiering is a form of unifying the underlying storage infrastructure to achieve good performance in both streaming and batch workloads, as well as cost effectiveness. Namely, by utilizing a combination of high-performance, expensive drives for streaming workloads and scale-out storage for less frequently accessed data, storage tiering for data streams targets a sweet spot in the latency-throughput trade-off while reducing storage costs, which is key for many organizations.

However, still, not all the streaming systems that provide storage tiering perform the storage tiering in the same way. Traditionally, the most common approach adopted by streaming systems is managing topic partitions from a local storage device to a long-term storage device, in which a partition manager manages moving topic partitions from a local storage device to a long-term storage device. While effective, this approach for managing partitions may inherit some disadvantages. For example, deploying a streaming system with storage tiering requires an administrator to identify (manually) what is the correct local storage capacity, which can be complex as the identification may need to consider the usual storage requirements for low-latency stream ingestion, as well as the storage needs from historical data reads.

Even worse, these streaming systems do not provide any back-pressure mechanism that considers both the throughput of a local storage device and a long-term storage device for throttling writers (or data writing devices) accordingly, if needed. This may lead to imbalanced situations in which data could be ingested at a higher rate than it can be tiered to the long-term storage device. Further, these streaming systems just implement storage bindings with the application programming interfaces (APIs) of the desired storage services/devices (they aim to store data to). That is, these systems provide no further data management or processing facilities on tiered stream data chunks once they are created.

For at least the reasons discussed above and without requiring resource (e.g., time, engineering, computing resource, etc.) intensive efforts, a fundamentally different approach is needed (e.g., a framework (e.g., a stream tiering proxy service) as a data management middleware for tiered streaming storage systems, which transparently mediates between streaming storage systems tiering data (or stream data) to an external storage device).

Embodiments disclosed herein relate to methods and systems for managing a data stream. As a result of the processes discussed below, one or more embodiments disclosed herein advantageously ensure that (at least, for example, for a better user experience): (i) despite the conventional solutions, the framework can transparently intercept storage requests and manage storage operations of tiered data streams (based on the requests); (ii) the framework is provided/enabled as a transparent data management layer (that executes one or more storage functions) between are related streaming storage system (that tiering data) and a related long-term storage (e.g., 140, 142, FIG. 1.1); (iii) storage functions (e.g., serverless storage functions) may be composed and distributed across a heterogeneous environment (e.g., 100, FIG. 1.1); (iv) a novel approach for data management of tiered streams is provided (where the approach can be used in, at least, content-aware data location, specialized data reduction, etc.); (v) different customer/user use cases (e.g., related to storing data) are considered by performing advanced data management upon ingestion of data chunks from tiered data streams; and/or (vi) the framework can be applied to virtually any streaming storage system performing storage tiering to cloud services.

The following describes various embodiments disclosed herein.

FIG. 1.1 shows a diagram of a system (100) in accordance with one or more embodiments disclosed herein. The system (100) includes any number of IoT devices or edge devices (e.g., Edge Device A (110A), Edge Device N (110N), etc.), any number of edge nodes (e.g., Edge Node A (112A), Edge Node N (112N), etc.), a cloud/core "subsystem" (e.g., a cloud device (113)), any number of long-term storages (e.g., Long-Term Storage A (140), Long-Term Storage B (142), etc.), a streaming storage system (125), and a network (130). The system (100) may facilitate the management of "stream" data from any number of sources (e.g., 110A, 110N, etc.). The system (100) may include additional, fewer, and/or different components without departing from the scope of the embodiments disclosed herein. Each component may be operably connected to any of the other components via any combination of wired and/or wireless connections. Each component illustrated in FIG. 1.1 is discussed below.

In one or more embodiments, the edge devices (e.g., 110A, 110N, etc.), the edge nodes (e.g., 112A, 112N, etc.), the long-term storages (e.g., 140, 142, etc.), the streaming storage system (125), the cloud device (113), and the network (130) may be (or may include) physical or logical devices, as discussed below. While FIG. 1.1 shows a specific configuration of the system (100), other configurations may be used without departing from the scope of the embodiments disclosed herein. For example, although the edge devices (e.g., 110A, 110N, etc.) and the streaming storage system (125) are shown to be operatively connected through a communication network (e.g., 130), the edge devices (e.g., 110A, 110N, etc.) and the streaming storage system (125) may be directly connected (e.g., without an intervening communication network).

As yet another example, although the edge devices (e.g., 110A, 110N, etc.) are considered as a first layer of the system (100), the edge nodes (e.g., 112A, 112N, etc.) are considered as a second layer of the system (100), and the cloud device (113) is considered as a third layer of the system (100), the system (100) may include another layer (e.g., a fog layer) in between the second layer and the third layer. The fog layer may include one or more "fog" devices, similar to that of edge nodes, in which both the edge nodes and fog devices perform distributed computing and focus on the physical deployment of compute and storage resources in relation to data that is being produced (e.g., the difference is a matter of where those resources are located such as edge computing refers to computational processes being done at or near the "edge" of an IoT environment (e.g., 100), whereas fog computing refers to the network connections between the edge nodes and the cloud device (or the cloud environment) to extend the cloud device closer to the edge of the IoT environment).

As yet another example, in one embodiment, a functional edge region (where the actual functioning happens such as, for example, a user uses an edge device (e.g., a client) to make a product or to deliver a service), a far edge region (including, at least, compute, storage, and/or network access devices focused on data acquisition and processing), and a near edge region of the system (100) may be co-located in one site/factory, and, in another embodiment, the functional edge and far edge regions may be co-located in one site and the near edge region may represent a cloud environment (or a cloud computing environment). In this example, the near edge region may be far away from the functional edge and far edge regions where the near edge region may represent a centralized and geographically distant cloud environment (e.g., an environment that is hundreds of miles away from the site).

In one or more embodiments, as being part of separate domains, each of the edge devices (e.g., 110A, 110N, etc.), the edge nodes (e.g., 112A, 112N, etc.), and the cloud device (113) may include the functionality to execute all and/or portions of applications. The execution of an application may provide computer-implemented services for users of the system (100). The computer-implemented services may include any combination of inferencing, data analytics, computer vision, database management, etc. The computer-implemented services may include other and/or additional types of computer-implemented services without departing from embodiments disclosed herein. In one or more embodiments, each of the edge devices (e.g., 110A, 110N, etc.), the edge nodes (e.g., 112A, 112N, etc.), and the cloud device (113) may be implemented as one or more computing devices.

An application may include one or more services (also referred to throughout this Detailed Description as tasks or application tasks). Each service may provide a portion of the functionality of the application. The services may include, for example, data collection services, data transformation services, data processing services, monitoring services, etc. The services may include other and/or additional types of services without departing from embodiments disclosed herein. An application may include any quantity of service instances associated with each service of the application without departing from embodiments disclosed herein.

Referring to FIG. 1.1, each domain of the system (100) may be considered as a hierarchy of domains. For example, the system's (100) (e.g., the heterogenous environment) domain topology may include one or more edge device domains (including, for example, 110A, 110N, etc.), edge node domains (including, for example, 112A, 112N, etc.), and cloud domains (including, for example, 113). The system's (100) domain topology may have any number of edge device domains, which may be operatively connected to any number of edge node domains, which may, in turn, be operatively connected to one or more cloud domains. Additionally, a domain topology may have more or less layers without departing from the scope of embodiments described herein.

In one or more embodiments, each computing device (e.g., 110A, 112A, 113, etc.) in a related domain of the system (100) may include a computing resource set (e.g., a hardware resource set, a device set, etc.). In one or more embodiments, the resource set of an edge device, or an edge node may be different from the resource set of the cloud device. For example, an edge device (e.g., 110A) may include sensors collecting data, controllers controlling the sensors, desktop devices, mobile computing devices, etc., in which the cloud device (113) may include a different device set. As yet another example, the cloud device (113) may include more powerful device set (e.g., having more compute resources), a greater quantity of more powerful devices, specific architectures of sets of devices for performing certain tasks, etc.

Further, each computing device (e.g., 110A, 112A, 113, etc.) in a related domain of the system (100) may be arranged based on geographical locations and/or geographical regions around the world. For example, the cloud device (113) may include a device set that is associated with and/or physically spans a first geographical region (e.g., the entirety of North America), in which an edge device (e.g., 110A) operatively connected to the cloud device may include a device set that is associated with and/or physically spans a portion of a second geographical region (e.g., Texas).

Further, the functioning of the edge devices (e.g., 110A, 110N, etc.), the edge nodes (e.g., 112A, 112B, etc.), and the cloud device (113) is not dependent upon the functioning and/or existence of the other components (e.g., devices) in the system (100). Rather, the edge devices, the edge nodes, and the cloud device may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data) (including multiple events, each of which is associated with a routing key) that are continuously produced by streaming data sources (e.g., writers, edge devices, etc.), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing streaming application data) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., edge devices). For example, the system may be configured to organize unbounded, continuously generated data into a data stream (described below in reference to FIG. 1.2) that may be auto-scaled based on individual segment loading. The system (100) may also represent a comprehensive middleware layer executing on computing devices (e.g., 300, FIG. 3) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the edge devices (e.g., 110A, 110N, etc.)) and other computations remotely (e.g., away from the users' site using the edge nodes (e.g., 112A, 112N, etc.), the cloud device (113), etc.) from the users. By doing so, the users may utilize different computing devices (e.g., 300, FIG. 3) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of an edge device (described below). The resource may be delivered to the edge device via, for example (but not limited to): conventional installation, a method for streaming, a VM executing on a remote computing device, execution from a removable storage device connected to the edge device (such as universal serial bus (USB) device), etc.

In one or more embodiments, an edge device (e.g., 110A, 110N, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the edge nodes (e.g., 112A, 112N, etc.)), store, or otherwise utilize captured sensor data (and/or any other type and/or quantity of data), and/or (iv) provide surveillance services (e.g., determining object-level information, performing face recognition, etc.) for scenes (e.g., a physical region of space). One of ordinary skill will appreciate that the edge device may perform other functionalities without departing from the scope of the embodiments disclosed herein.

As discussed above, the edge devices (e.g., 110A, 110N, etc.) may be geographically distributed devices (e.g., user devices, front-end devices, etc.) and may have relatively restricted hardware and/or software resources when compared to the edge nodes (e.g., 112A, 112N, etc.) and/or the cloud device (113). As being, for example, a sensing device, each of the edge devices may be adapted to provide monitoring services. For example, an edge device may monitor the state of a scene (e.g., objects disposed in a scene). The monitoring may be performed by obtaining sensor data from sensors that are adapted to obtain information regarding the scene, in which an edge device may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the embodiments disclosed herein. For example, the sensor data may be implemented as a tree, a table, a linked list, etc.

In one or more embodiments, the edge devices (e.g., 110A, 110N, etc.) may be physical or logical computing devices configured for hosting one or more workloads, or for providing a computing environment whereon workloads may be implemented. The edge devices may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the edge devices). The edge devices (e.g., 110A, 110N, etc.) may correspond to computing devices that one or more users use to interact with one or more components of the system (100).

In one or more embodiments, an edge device (e.g., 110A, 110N, etc.) may represent a physical appliance or computing device operated by one or more individuals of (or employed by) an organization. Examples of said individual(s) may include, but not limited to, any organization executive(s) (e.g., chief executive officer (CEO), chief financial officer (CFO), etc.) and any employee(s) in the data management team of the organization (e.g., an administrator). Further, the organization may refer to any enterprise at least engaged in for-profit commercial, industrial, or professional activities.

In one or more embodiments, an edge device (e.g., 110A, 110N, etc.) may include any number of applications (and/or content accessible through the applications) that provide computer-implemented services to a user. Applications may be designed and configured to perform one or more functions instantiated by a user of the edge device. In order to provide application services, each application may host similar or different components. The components may be, for example (but not limited to): instances of databases, instances of email servers, etc. Applications may be executed on one or more edge devices as instances of the application.

Applications may vary in different embodiments, but in certain embodiments, applications may be custom developed or commercial (e.g., off-the-shelf) applications that a user desires to execute in an edge device (e.g., 110A, 110N, etc.). In one or more embodiments, applications may be logical entities executed using computing resources of an edge device. For example, applications may be implemented as computer instructions stored on persistent storage of the edge device that when executed by the processor(s) of the edge device, cause the edge device to provide the functionality of the applications described throughout the application.

In one or more embodiments, while performing, for example, one or more operations requested by a user, applications installed on an edge device (e.g., 110A, 110N, etc.) may include functionality to request and use physical and logical resources of the edge device. Applications may also include functionality to use data stored in storage/memory resources of the edge device. The applications may perform other types of functionalities not listed above without departing from the scope of the embodiments disclosed herein. While providing application services to a user, applications may store data that may be relevant to the user in storage/memory resources of the edge device.

In one or more embodiments, to provide services to the users, the edge devices (e.g., 110A, 110N, etc.) may utilize, rely on, or otherwise cooperate with the edge nodes (e.g., 112A, 112N, etc.) and/or the cloud device (113). For example, the edge devices may issue requests to an edge node (e.g., 112A) to receive responses and interact with various components of the edge node. The edge devices may also request data from and/or send data to the edge node (for example, the edge devices may transmit information to the edge node that allows the edge node to perform computations, the results of which are used by the edge devices to provide services to the users). As yet another example, the edge devices may utilize computer-implemented services provided by the cloud device (113). When the edge devices interact with the cloud device, data that is relevant to the edge devices may be stored (temporarily or permanently) in the cloud device.

In one or more embodiments, an edge device (e.g., 110A, 110N, etc.) may be capable of, e.g.: (i) collecting users' inputs, (ii) correlating collected users' inputs to the computer-implemented services to be provided to the users, (iii) communicating with the edge nodes (e.g., 112A, 112N, etc.) and/or the cloud device (113) that perform computations necessary to provide the computer-implemented services, (iv) using the computations performed by the edge nodes and/or the cloud device to provide the computer-implemented services in a manner that appears (to the users) to be performed locally to the users, and/or (v) communicating with any virtual desktop (VD) in a virtual desktop infrastructure (VDI) environment (or a virtualized architecture) provided by the cloud device (using any known protocol in the art), for example, to exchange remote desktop traffic or any other regular protocol traffic (so that, once authenticated, users may remotely access independent VDs).

As described above, the edge devices (e.g., 110A, 110N, etc.) may provide computer-implemented services to users (and/or other computing devices). The edge devices may provide any number and any type of computer-implemented services. To provide computer-implemented services, each edge device may include a collection of physical components (e.g., processing resources, storage/memory resources, networking resources, etc.) configured to perform operations of the edge device and/or otherwise execute a collection of logical components (e.g., virtualization resources) of the edge device.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the edge devices (e.g., 110A, 110N, etc.) provide computer-implemented services to users, the edge devices may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the edge devices (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface an edge device with external entities (e.g., the edge nodes (e.g., 112A, 112N, etc.), the cloud device (113), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the edge device and the external entities. For example, a networking resource may enable the edge device to be operatively connected, via Ethernet, using a TCP protocol to form a "network fabric", and may enable the communication of data between the edge device and the external entities. In one or more embodiments, each edge device may be given a unique identifier (e.g., an Internet Protocol (IP) address) to be used when utilizing the above-mentioned protocols.

Further, a networking resource, when using a certain protocol or a variant thereof, may support streamlined access to storage/memory media of other edge devices (e.g., 110A, 110N, etc.). For example, when utilizing remote direct memory access (RDMA) to access data on another edge device, it may not be necessary to interact with the logical components of that edge device. Rather, when using RDMA, it may be possible for the networking resource to interact with the physical components of that edge device to retrieve and/or transmit data, thereby avoiding any higher level processing by the logical components executing on that edge device.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of an edge device (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the edge device, cause the edge device to provide the functionality of the hypervisor.

In one or more embodiments, an edge device (e.g., 110A, 110N, etc.) may be, for example (but not limited to): a physical computing device, a smartphone, a tablet, a wearable, a gadget, a closed-circuit television (CCTV) camera, a music player, a game controller, etc. Different edge devices may have different computational capabilities. In one or more embodiments, Edge Device A (110A) may have 16 gigabytes (GB) of dynamic RAM (DRAM) and 1 CPU with 12 cores, whereas Edge Device N (110N) may have 8 GB of PMEM and 1 CPU with 16 cores. Other different computational capabilities of the edge devices not listed above may also be taken into account without departing from the scope of the embodiments disclosed herein.

Figure 3:
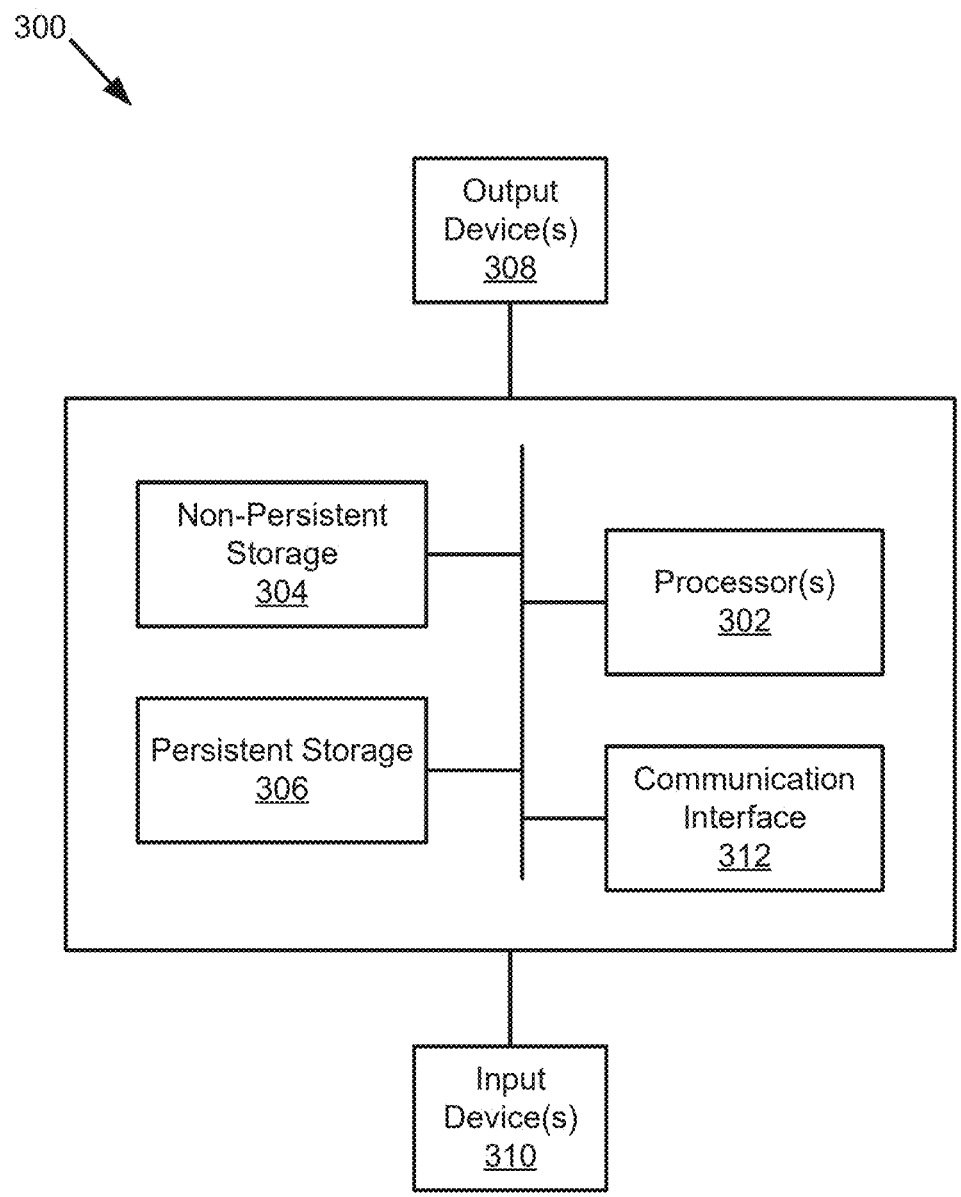
FIG. 3 shows a diagram of a computing device in accordance with one or more embodiments disclosed herein.

Further, in one or more embodiments, an edge device (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge device described throughout the application.

Alternatively, in one or more embodiments, the edge device (e.g., 110A, 110N, etc.) may be implemented as a logical device (e.g., a VM). The logical device may utilize the computing resources of any number of computing devices to provide the functionality of the edge device described throughout this application.

In one or more embodiments, users (e.g., customers, administrators, organization executives, etc.) may interact with (or operate) the edge devices (e.g., 110A, 110N, etc.) in order to perform work-related tasks (e.g., production workloads). In one or more embodiments, the accessibility of users to the edge devices may depend on a regulation set by an administrator of the edge devices. To this end, each user may have a personalized user account that may, for example, grant access to certain data, applications, and computing resources of the edge devices. This may be realized by implementing the virtualization technology. In one or more embodiments, an administrator may be a user/person/human with permission (e.g., a user that has root-level access) to make changes on the edge devices that will affect other users of the edge devices.

In one or more embodiments, for example, a user may be automatically directed to a login screen of an edge device when the user connected to that edge device. Once the login screen of the edge device is displayed, the user may enter credentials (e.g., username, password, etc.) of the user on the login screen. The login screen may be a graphical user interface (GUI) generated by a visualization module (not shown) of the edge device. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, through the concept of edge computing, some of the computational load may be moved towards to the edge of the network to harness computational capabilities (of the edge nodes (e.g., 112A, 112N, etc.)) that may be untapped, which are located closer (for example, one-hop away from an edge device (e.g., 110A, 110N, etc.)) to users to reduce possible network latency (for example, for mission critical and/or latency-sensitive applications).

In one or more embodiments, to be able to communicate with the cloud device (113) (e.g., an IoT hub), an edge device (e.g., 110A, 110N, etc.) and/or an edge node (e.g., 112A, 112N, etc.) may register to the IoT hub. For example, to be able to register/connect to the IoT hub, an edge node may make an API call to the IoT hub. Based on receiving an API call from the edge node, the IoT hub may send a connection string (which has a predetermined length) to the edge node. The edge node may then use the connection string to connect to the IoT hub.

In one or more embodiments, the connection string may be a data structure that includes one or more parameters (e.g., location information of the cloud device (113), authentication information associated with the cloud device (113), etc.) required for an entity to connect to the IoT hub (or any component of the IoT hub). In one or more embodiments, the corresponding component of the IoT hub may be offline for, for example, a system maintenance to configure and upgrade an operating system (OS). While the corresponding component is offline, the connection between an edge node (e.g., 112A, 112N, etc.) and the corresponding component may be disconnected. When the corresponding component comes back online, the edge node may reconnect to the corresponding component using the same connection string.

In one or more embodiments, an edge node (e.g., 112A, 112N, etc.) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, an edge node (e.g., 112A, 112N, etc.) may include functionality to, e.g.: (i) obtain (or receive) data (e.g., any type and/or quantity of input) from any source (and, if necessary, aggregate the data); (ii) perform complex analytics and analyze data that is received from one or more edge devices (e.g., 110A, 110N, etc.) to generate additional data that is derived from the obtained data without experiencing any middleware and hardware limitations; (iii) provide meaningful information (e.g., a response) back to the corresponding edge devices; (iv) filter data (e.g., received from an edge device) before pushing the data (and/or the derived data) to the cloud device (113), Long-Term Storage A (140), or to Long-Term Storage B (142) for management of the data and/or for storage of the data (while pushing the data, the edge node may include information regarding a source of the data (e.g., an identifier of the source) so that such information may be used to associate provided data with one or more of users (or data owners)); (v) provide power management strategies to prevent overloading of the cloud device (113) with trivial tasks (e.g., by performing those tasks without significant energy implications); (vi) reduce the response time of an edge device by minimizing the volume of network traffic to the cloud device or by distributing traffic in the network (130); (vii) incorporate strategies (e.g., strategies to provide VDI capabilities) for remotely enhancing capabilities of an edge device; (viii) provide robust security features to an edge device and make sure that a minimum level of service is always provided to a user of the edge device; (ix) host and maintain various workloads; (x) provide a computing environment whereon workloads may be implemented (e.g., employing linear, non-linear, and/or ML models to perform cloud-based data processing); (xi) transmit the result(s) of the computing work performed (e.g., real-time business insights, equipment maintenance predictions, other actionable responses, etc.) to the cloud device (113) for review and/or other human interactions; (xii) reduce latency and the amount of on-cloud computations; (xiii) when outlier data appears in data obtained from an edge device, perform an action to provide a real-time response to local events occurred in the edge device (due to its proximity, where no round-trip is needed from the edge device to a cloud device); (xiv) exchange data with other devices registered in/to the network (130) in order to, for example, participate in a collaborative workload placement (e.g., the node may split up a request (e.g., an operation, a task, an activity, etc.) with another node (e.g., 112N), coordinating its efforts to complete the request more efficiently than if the node had been responsible for completing the request); (xv) provide software-defined data protection for the edge devices (e.g., 110A, 110N, etc.); (xvi) provide automated data discovery, protection, management, and recovery operations for the edge devices; (xvii) monitor operational states of the edge devices; (xviii) regularly back up configuration information of the edge devices to Long-Term Storage A (140) and/or to Long-Term Storage A (142); (xix) in response to a power failure (or a potential power failure), communicate with a second edge node in the system (100) and obtain any zone/location information of the second edge node to determine whether the second edge node is available to process data obtained from one or more edge devices; (xx) provide (e.g., via a broadcast, multicast, or unicast mechanism) information (e.g., a location identifier, the amount of available resources, etc.) associated with itself to other edge nodes of the system (100); (xxi) configure or control any mechanism that defines when, how, and what data to provide to the cloud device and/or fog devices; (xxii) provide data deduplication; (xxiii) orchestrate data protection through one or more GUIs; (xxiii) empower data owners (e.g., users of the edge devices) to perform self-service data backup and restore operations from their native applications; (xxiv) ensure compliance and satisfy different types of service level objectives (SLOs) set by an administrator/user; (xxv) increase resiliency of an organization by enabling rapid recovery or cloud disaster recovery from cyber incidents; (xxvi) consolidate multiple data process or protection requests (received from, for example, edge devices) so that duplicative operations (which may not be useful for restoration purposes) are not generated; (xxvii) initiate multiple data process or protection operations in parallel (in which each of the multiple operations may (a) manage the initiation of a respective operation and (b) operate concurrently to initiate multiple operations); and/or (xxviii) manage operations of the edge devices to improve their operations (e.g., improve the quality of data being generated, decrease the computing resources cost of generating data, etc.). In one or more embodiments, in order to read, write, or store data, an edge node (e.g., 112A) may communicate with, for example, Long-Term Storage A (140), Long-Term Storage B (142), and/or other storage devices in the system (100).

In one or more embodiments, monitoring operational states of the edge devices (e.g., 110A, 110N, etc.) may be used to determine whether it is likely that the monitoring of the scenes by the edge devices results in information regarding the scenes that accurately reflects the states of the scenes (e.g., an edge device may provide inaccurate information regarding a monitored scene). Said another way, by providing monitoring services, an edge node (e.g., 112A) may be able to determine whether an edge device is malfunctioning (e.g., the operational state of an edge device may change due to a damage to the edge device, malicious action (e.g., hacking, a physical attack, etc.) by third-parties, etc.). If the edge device is not in the predetermined operational state (e.g., if the edge device is malfunctioning), the edge node may take action to remediate the edge device. Remediating the edge device may result in the edge device being placed in the predetermined operational state which improves the likelihood that monitoring of the scene by the edge device results in the generation of accurate information regarding the scene.

As described above, an edge node (e.g., 112A) may be capable of providing a range of functionalities/services to the users of the edge devices (e.g., 110A, 110N, etc.). However, not all of the users may be allowed to receive all of the services. To manage the services provided to the users of the edge devices, a system (e.g., a service manager) in accordance with embodiments disclosed herein may manage the operation of a network (e.g., 130), in which the edge devices are operably connected to the edge node. Specifically, the service manager (i) may identify services to be provided by the edge node (for example, based on the number of users using the edge devices) and (ii) may limit communications of the edge devices to receive edge node provided services.

For example, the priority (e.g., the user access level) of a user may be used to determine how to manage computing resources of the edge node (e.g., 112A) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the edge node (e.g., 112A) (e.g., while the computing resources of the edge node may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the edge devices (e.g., 110A, 110N, etc.) may be granularly configured without modifying the operation(s) of the edge devices and (ii) the overhead for managing the services of the edge devices may be reduced by not requiring modification of the operation(s) of the edge devices directly.

In contrast, a second user may be determined to be a high-priority user (e.g., a privileged user, a user with a user access level of 9/10). In such a case, the user level of that user may indicate that more ports are to be opened than were for the first user so that (i) the edge node (e.g., 112A) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single edge node (e.g., 112A) is considered above, the term "node" includes any collection of systems or sub-systems that individually or jointly execute a set, or multiple sets, of instructions to provide one or more computer-implemented services. For example, a single edge node may provide a computer-implemented service on its own (i.e., independently) while multiple other edge nodes may provide a second computer-implemented service cooperatively (e.g., each of the multiple other nodes may provide similar and or different services that form the cooperatively provided service).

As described above, an edge node (e.g., 112A) may provide any quantity and any type of computer-implemented services. To provide computer-implemented services, the edge node may be a heterogeneous set, including a collection of physical components/resources (discussed above) configured to perform operations of the node and/or otherwise execute a collection of logical components/resources (discussed above) of the node.

In one or more embodiments, an edge node (e.g., 112A) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that an edge node (e.g., 112A) may perform other functionalities without departing from the scope of the embodiments disclosed herein.

In one or more embodiments, an edge node (e.g., 112A, 112N, etc.) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge node described throughout the application.

Alternatively, in one or more embodiments, similar to an edge device (e.g., 110A, 110N, etc.), the edge node may also be implemented as a logical device.

In one or more embodiments, the cloud device (113) may represent a computing device (that forms a cloud computing environment) that is owned and/or operated by a third-party, for example, by a third-party providing cloud services. Cloud computing environments (which may or may not be public) may include storage environments that may provide data protection functionalities for one or more users. Cloud computing environments may also perform computer-implemented services (e.g., data protection, data processing, etc.), via one or more cloud devices, on behalf of one or more users.

In one or more embodiments, as being a physical computing device or a logical computing device, the cloud device (113) may provide less, the same, or more functionalities and/or services (described above) comparing to an edge node (e.g., 112A). Further, the cloud device (113) may be a heterogeneous set, including different types of hardware components, software components, and/or different types of OSs. One of ordinary skill will appreciate that the cloud device (113) may perform other functionalities without departing from the scope of the embodiments disclosed herein.

In the embodiments of the present disclosure, the streaming storage system (125) is demonstrated as a separate entity from, for example, an edge node (e.g., 112A); however, embodiments herein are not limited as such. The streaming storage system (125) may be demonstrated as part of an edge node (e.g., as deployed to an edge node). Additional details of the streaming storage system are described below in reference to FIG. 1.2.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the edge devices, the edge nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the edge devices and the edge nodes through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

In one or more embodiments, the system (100) further includes data management middleware (e.g., the stream tiering proxy service (which is a containerized and distributed service), see FIG. 1.2) for the streaming storage system (125). The stream tiering proxy service transparently mediates between the streaming storage system (125) tiering data to, for example, Long-Term Storage A (140) or Long-Term Storage B (142).

Referring to FIG. 1.2, the stream tiering proxy service (or "the stream tiering proxy") may include one or more managers (e.g., Manager A (111A), Manager B (111B), etc.), in which, depending on the manager's computing resource requirements, a manager may be executed on a corresponding computing device. For example, because the computing resources required to execute Function A and Function B (which are employed by Manager E (111E)) are available on the cloud device (113), Manager E (111E) may be deployed to the cloud device (113). As yet another example, because the computing resources required to execute Function C and Function D (which are employed by Manager A (111A)) are available on Edge Device A (110A), Manager A (111A) may be deployed to Edge Device A (110A). In one or more embodiments, Managers B-E (111B-111E) may be instances of Manager A (110), employing different types of functions (e.g., a Function-as-a-Service (FaaS)) depending on a user's requirements.

In one or more embodiments, the stream tiering proxy may be exposed as a service (via, for example, an API, an application service layer/interface (e.g., 117, FIG. 1.2), etc.) to the streaming storage system (125). As being part of the service, a manager (e.g., 111A, 111E, etc.) may perform the method described below in reference to FIG. 2. Further, the manager may obtain information from a related entity (e.g., a user, an administrator, another manager, etc.) and share the information with other managers in the stream tiering proxy (so that all the managers of the stream tiering proxy will be up to date). In one or more embodiments, the information may include, for example (but not limited to): metadata (including function metadata and a user-defined data management policy), binary program files for functions/applications including compiled code (e.g., function binaries that specify an actual compression algorithm for a function to apply), configuration files, communication information (e.g., user identifiers, network addresses, URLs, etc.), security information (e.g., encryption keys, digital signatures, certificates, etc.), etc.

In one or more embodiments, the stream tiering proxy (via one or more managers) may intercept storage operations (or storage requests to initiate storage operations) related to stream data chunks and execute storage functions on the data chunks. This implies that users/administrators may deploy newer storage function code (e.g., function binaries) to the stream tiering proxy, after passing the appropriate stability and security validation (e.g., the correctness and security check). While there may be various ways to deploy storage function binaries, as a non-limiting example, function binaries may be stored in container images of the stream tiering proxy (and may only be executed after the correctness and security check) so that all (or a subset of) the managers (or manager instances) can be updated accordingly (to have/execute newer storage functions).

In one or more embodiments, function metadata may include, for example (but not limited to): computing resource capabilities of an edge device (e.g., 110A) that hosts a first function and a second function, an identifier of the first function, an identifier of the second function, a type of the first function, a type of the second function, computing resources required to execute the first function, computing resources required to execute the second function, computing resource capabilities of an edge node (e.g., 112A) that hosts a third function and a fourth function, etc. In one or more embodiments, a function may become aware of another function based on the function metadata.

In one or more embodiments, the user-defined data management policy (e.g., a data structure) may be a function-specific policy defined by a user, in which the policy may dictate when and how, for example, a first function and a second function are allowed to process a set of data chunks of a stream (or stream data) (e.g., "for stream S1, execute Function A", "for stream S2, route on Function T", etc.). Said another way, the decision of when and what storage functions are executed on which tiered stream data chunks is defined by a user via the policy. For example, a user may define a policy to apply a specific type of data compression on a particular stream, such as "for stream S2, execute Compression D." Once the policy is persisted/stored in the metadata, the stream tiering proxy (via one or more managers) may execute "Compression D" function on all the storage operations related to stream S2. Separately, the stream tiering proxy may also manage more complex operations, such as executing multiple storage functions in a pipeline (e.g., composing storage functions). As indicated, the stream tiering proxy (via one or more managers) may compose or pipeline multiple storage functions for the same storage operation. For example, the proxy may execute a storage function that deduplicates a large data chunk of tiered stream data, and after that (assuming that the data cannot be deduplicated further), the proxy may execute another function that decides where to store/tier that deduplicated data chunk. In this non-limiting example, a related user/administrator may need to be an expert in understanding that the defined composition of functions is feasible (e.g., one may count words of a tiered stream data chunk and then encrypt the data chunk, but not the other way around). The user-defined data management policy may include/specify other and/or additional requirements without departing from embodiments disclosed herein.

One of ordinary skill will appreciate that the stream tiering proxy may perform other functionalities without departing from the scope of the embodiments disclosed herein. In one or more embodiments, the stream tiering proxy is implemented using one or more physical or logical computing devices. Additional details of the stream tiering proxy (or the stream tiering proxy service) are described below in reference to FIG. 1.2.

As discussed above, the system (100) further includes Long-Term Storage A (140) and Long-Term Storage B (142). Details of Long-Term Storage A (140) and Long-Term Storage B (142) are described below in reference to FIG. 1.2.

While FIG. 1.1 shows a configuration of components, other system configurations may be used without departing from the scope of the embodiments disclosed herein.

Turning now to FIG. 1.2, FIG. 1.2 shows a diagram of the system (from a different perspective) in accordance with one or more embodiments disclosed herein. The streaming storage system (125) includes a controller (162), a logger (166) (e.g., a bookkeeper service), a segment store (SS) (164), and a consensus service (168) (e.g., a zookeeper service). The streaming storage system (125) may include additional, fewer, and/or different components without departing from the scope of the embodiments disclosed herein. For example, based on the amount of available computing resources in an edge node (e.g., 112A, FIG. 1.1), the streaming storage system (125) may host multiple controllers, segment containers (SCs) (e.g., 165A, 165B, etc.), and/or SSs executing contemporaneously, e.g., distributed across multiple servers, VMs, or containers, for scalability and fault tolerance. Each component may be operably connected to any of the other component via any combination of wired and/or wireless connections. Each component illustrated in FIG. 1.2 is discussed below.

The embodiment shown in FIG. 1.2 may show a scenario in which (i) one or more SCs (e.g., 165A, 165B, etc.) are distributed across the SS (164) and (ii) the streaming storage system (125) is an independent system (e.g., meaning that the streaming storage system may customize the resource usage of the SS independently, in an isolated manner).

In one or more embodiments, the streaming storage system (125) allows users (e.g., via edge devices (e.g., Edge Device A (110A))) to ingest data and execute real-time analytics/processing on that data (while guaranteeing data consistency and durability (e.g., once acknowledged, data is never lost)). With the help of the SS (164), the data may be progressively moved to Long-Term Storage A (140) or Long-Term Storage B (142) so that users may have access to the data to perform, for example, large-scale batch analytics (e.g., on the cloud device (e.g., 113, FIG. 1.1) (with more resources)), live and historical data playback, etc. Users may define clusters that execute a subset of assigned SCs across the system/framework (e.g., 100, FIG. 1.1) so that different subsets of SCs may be executed on independent clusters (which may be customized in terms of instances and resources per-instance) to adapt different kinds of workloads and hardware components.

In one or more embodiments, the controller (162) may represent a "control plane" and the SS (164) may represent a "data plane". The SS (164) may execute/host, at least, SC A (165A) and SC (165B) (as "active" SCs, so they may serve write/read operations) (e.g., low-latency durable atomic writes), in which an SC is a unit of parallelism in the streaming storage system (or a unit of work of a SS) and is responsible for executing any storage or metadata operations against the segments (described below) allocated in it. Due to the design characteristics of the streaming storage system (e.g., with the help of the integrated storage tiering mechanism of the streaming storage system), the SS (164) may store data to Long-Term Storage A (140) or Long-Term Storage B (142), in which the tiering storage may be useful to provide instant access to recent stream data. Although not shown, the streaming storage system/service (125) may include one or more processors, buses, and/or other components without departing form the scope of the embodiments disclosed herein.

In one or more embodiments, an SC may represent how the streaming storage system (125) partitions a workload (e.g., a logical partition of the workload at the data plane) in order to host segments of streams. Once (automatically) initialized/initiated, an SC may keep executing on its corresponding SS (e.g., a physical component) to perform one or more operations, where, for example, Edge Device A (110A) may not be aware of what the location of an SC in the streaming storage system (125) (e.g., in case Edge Device A wants to generate a new stream with a segment).

In one or more embodiments, depending on the computing resource capabilities (e.g., resource related parameters, a hardware resource set, etc.) of the streaming storage system (125) (which may be customized over time), the SS (164) (and the SCs hosted by that SS) may provide different functionalities (e.g., providing a better performance). In one or more embodiments, a resource related parameter may include (or specify), for example (but not limited to): a configurable CPU option (e.g., a valid/legitimate virtual CPU count per SS), a configurable network resource option (e.g., allowability of enabling/disabling single-root input/output virtualization (SR-IOV) for specific APIs), a configurable memory option (e.g., maximum and minimum memory per SS), a configurable GPU option (e.g., allowable scheduling policy and/or virtual GPU count combinations), a configurable DPU option (e.g., legitimacy of disabling inter-integrated circuit (I2C) for different SSs), a user type, a network resource related template (e.g., a 10 GB/s BW with 20 ms latency QoS template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a vCPU count per SS (e.g., 2, 4, 8, 16, etc.), a speed select technology configuration (e.g., enabled, disabled, etc.), an SS IOMMU configuration (e.g., enabled, disabled, etc.), a wake on LAN support configuration (e.g., supported/enabled, not supported/disabled, etc.), a reserved memory configuration (e.g., as a percentage of configured memory such as 0-100%), a memory ballooning configuration (e.g., enabled, disabled, etc.), a vGPU count per SS (e.g., 1, 2, 4, 8, etc.), a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU, hypervisor-enabled drivers approach such as virtual shared graphics acceleration (vSGA), etc.), a user profile folder redirection configuration (e.g., a local user profile, a profile redirection, etc.), a number of SCs available to perform an operation (e.g., 0, 10, 20, etc.), etc.

In one or more embodiments, the control plane may include functionality to, e.g.,: (i) in conjunction with the data plane, generate, alter, and/or delete streams (e.g., index streams (which are useful to enforce retention), byte streams (which are useful to access data randomly at any byte offset), event streams (which are useful to allow parallel writes/reads), etc.); (ii) retrieve information about streams; and/or (iii) monitor health of a streaming storage system cluster (described below) by gathering metrics (e.g., data stream metrics). Further, the SS (164) may provide an API to read/write data in streams.

In one or more embodiments, a "data" stream (described below) may be partitioned/decomposed into stream segments (or simply "segments"). A stream may have one or more segments (where each segment may be stored in a combination of tier-1 storage (e.g., a durable log) and tier-2 storage (e.g., Long-Term Storage A (140), Long-Term Storage B (142), etc.), in which data/event written into the stream may be written into exactly one of the segments based on the event's routing key (e.g., "writer.writeEvent (routingkey, message)"). In one or more embodiments, writers (e.g., of Edge Device A (110A)) may use routing keys (e.g., user identifier, timestamp, machine identifier, etc., to determine a target segment for a stream write operation) so that data is grouped together.

In one or more embodiments, based on the inherent capabilities of the streaming storage system (125), data streams may have multiple open segments in parallel (e.g., enabling the data stream parallelism), both for ingesting and consuming data. The number of parallel stream segments in a stream may automatically grow and shrink over time based on the I/O load (or fluctuations) the stream receives, so that the parallelism of the stream may be modified based on the number of serverless functions to be executed, if needed.

As described above, a data stream with one or more segments may support parallelism of data writes, in which multiple writers (or multiple writer components) writing data to different segments may exploit/involve one or more servers hosted in a cluster (e.g., one or more servers, the controller (162), and the SS (164) may collectively be referred to as a "streaming storage system cluster", in which the cluster may be coordinated to execute the streaming storage system). In one or more embodiments, a consistent hashing scheme may be used to assign incoming events to their associated segments (such that each event is mapped to only one of the segments based on "user-provided" or "event" routing key), in which event routing keys may be hashed to form "key space" and the key space may be divided into a number of partitions, corresponding to the number of segments. Additionally, each segment may be associated with only one instance of SS (e.g., the SS (164)).

In one or more embodiments, from the perspective of a reader component (e.g., Edge Device A (110A) may include a writer component and a reader component), the number of segments may represent the maximum degree of read parallelism possible (e.g., all the events from a set of streams will be read by only one reader in a "reader group (RG)". If a stream has N segments, then an RG with N reader components may consume from the stream in parallel (e.g., for any RG reading a stream, each segment may be assigned to one reader component in that RG). In one or more embodiments, increasing the number of segments may increase the number of readers in an RG to increase the scale of processing the data from that stream, whereas, as the number of segments decreases, the number of readers may be reduced.

In one or more embodiments, a reader component may read from a stream either at the tail of the stream or at any part of the stream's historical data. Unlike log-based systems that use the same kind of storage for tail reads/writes as well as reads to historical data, a tail of a stream may be kept in tier-1 storage, where write operations may be implemented by the logger (166) as described herein. In some cases (e.g., when a failure has occurred and the system is being recovered), the logger may serve read operations.

In one or more embodiments, the streaming storage system (125) may implement exactly-once semantics (or "exactly-once delivery semantics"), which means data is delivered and processed exactly-once (with exact ordering guarantees), despite failures in, for example, Edge Device A (110A), servers, serverless functions (e.g., a mapper function, a reducer function, etc.), stateful operators, and/or the network (e.g., 130, FIG. 1.1). To achieve exactly-once semantics, streams may be durable, ordered, consistent, and/or transactional (e.g., embodiments disclosed herein may enable durable storage of streaming data with strong consistency, ordering guarantees, and high-performance).

As used herein, "ordering" may mean that data is read by reader components in the order it is written. In one or more embodiments, data may be written along with an application-defined routing key, in which the ordering guarantee may be made in terms of routing keys (e.g., a write order may be preserved by a routing key, which may facilitate write parallelism). For example, two pieces of data with the same routing key may be read by a reader in the order they were written. In one or more embodiments, the streaming storage system (more specifically, the SS (164)) may enable an ordering guarantee to allow data reads to be replayed (e.g., when applications fail) and the results of replaying the reads (or the read processes) may be the same.

As used herein, "consistency" may mean that reader components read the same ordered view of data for a given routing key, even in the case of a failure (without missing any data/event). In one or more embodiments, the streaming storage system (more specifically, the SS (164)) may perform idempotent write processes, where rewrites performed as a result of failure recovery may not result in data duplication (e.g., a write process may be performed without suffering from the possibility of data duplication (and storage overhead) on reconnections).

In one or more embodiments, the SS (164) may automatically (e.g., elastically and independently) scale individual data streams to accommodate changes in a data ingestion rate. The SS may enable shrinking of write latency to milliseconds, and may seamlessly handle high-throughput reads/writes from Edge Device A (110A), making the SS ideal for IoT and other time-sensitive implementations. For example, consider a scenario where an IoT application receives information from hundreds of devices feeding thousands of data streams. In this scenario, the IoT application processes those streams to derive a business value from all that raw data (e.g., predicting device failures, optimizing service delivery through those devices, tailoring a user's experience when interacting with those devices, etc.). As indicated, building such an application at scale is difficult without having the components be able to scale automatically as the rate of data increases and decreases.

In one or more embodiments, a data stream may be configured to grow the number of segments as more data is written to the stream, and to shrink when data volume drops off. In one or more embodiments, growing and shrinking a stream may be performed based on a stream's SLO (e.g., to match the behavior of data input). For example, the SS (164) may enable monitoring a rate of data ingest/input to a stream and use the SLO to add or remove segments from the stream. In one or more embodiments, (i) segments may be added by splitting a segment/shard/partition of a stream (e.g., scaling may cause an existing segment, stored at the related data storage thus far, to be split into plural segments; scaling may cause an existing event, stored at the corresponding data storage thus far, to be split into plural events; etc.), (ii) segments may be removed by merging two segments (e.g., scaling may cause multiple existing segments to be merged into a new segment; scaling may cause multiple existing events to be merged into a new event; etc.), and/or (iii) the number of segments may vary over time (e.g., to deal with a potentially large amount of information in a stream). Further, a configuration of a writer component may not change when segments are split or merged, and a reader component may be notified via a stream protocol when segments are split or merged to enable reader parallelism.

Referring to FIG. 1.1, an edge node (e.g., 112A, FIG. 1.1) may execute one or more stateful or stateless operators/functions (e.g., serverless functions that are connected with one or more data streams) that provides/reports unified and real-time analytics/metrics to another function being executed on the cloud device (e.g., 113, FIG. 1.1), while (i) achieving high-throughput and low-latency stream data processing, and (ii) supporting complex event processing and state management. In one or more embodiments, edge devices (e.g., 110A, FIG. 1.1), edge nodes (e.g., 112A, FIG. 1.1), the cloud device (e.g., 113, FIG. 1.1), and the streaming storage system (125) may treat a data stream as a first-class primitive, which makes them useful to jointly construct data stream processing pipelines (using serverless functions). In order to enable the streaming storage system (125) to be a data source/sink for, for example, an edge node (so that, for example, one or more serverless functions may read/write data from/to the SS (164)), each of the serverless functions may execute a connector (e.g., a physical device (i.e., hardware), a logical intelligence (i.e., software), or a combination thereof). For example, a connector of a serverless function may provide a seamless integration with the components of the streaming storage system (125), thereby ensuring parallel data reads/writes, checkpointing, and guaranteeing exactly-once processing with the streaming storage system (125).

As discussed above, one or more readers are organized into an RG and the streaming storage system (125) guarantees that each event written to a data stream is sent exactly one reader with the RG. Further, different RGs may simultaneously read from any given data stream, in which each reader in an RG is assigned to zero or more SSs. This means that a reader that is assigned to a SS is the only reader (within its RG) that reads events from that SS. Readers within an RG may dynamically re-balance the assignment of segments, for example, upon a membership change (e.g., having more or less readers in an RG over time) or when the number of parallel SSs changes because of stream auto-scaling. With the help of a related API (which is provided by its connector), a serverless function may read data streams (from the streaming storage system (125)) to perform one or more streaming jobs.

Further, a connector of a serverless function may ensure a failure recovery for streaming jobs (that are assigned to that serverless function). More specifically, (i), for example, a related edge node (e.g., 112A, FIG. 1.1) may implement an asynchronous periodic checkpoint concept (e.g., via the Chandy-Lamport model) to make, for example, serverless function state and stream positions recoverable (for a related serverless function), and (ii) the streaming storage system (125) may implement its own checkpoint concept that applies, for example, an RG that reads from a data stream (where an RG checkpoint generates a consistent reference for a position in the stream that an application (e.g., a serverless function) can roll back to). In one or more embodiments, the connector may have a functionality to combine both checkpoint concepts to recover a stream processing job (e.g., to guarantee failure recovery).

In one or more embodiments, a connector of a serverless function may allow stream processing jobs to write their results to the SS (164) in a consistent, durable, and ordered manner. When used as a sink for stream processing jobs, the connector may also provide exactly-once semantics, in which each incoming event is guaranteed to be effectively processed (e.g., read or written) only once. To be able to provide exactly-once semantics, the connector may implement one or more retries, which means that output of a stream processing job may be partially written. To this end, the streaming storage system (125) (as a data sink) may need to support commits and rollbacks (e.g., to prevent duplicate data reading and to enable recovery in case of a failure), in which the streaming storage system already supports transactional writes (which satisfies the requirement of committing and rolling back).

In one or more embodiments, transactions may (i) allow applications (e.g., serverless functions) to prepare and then commit a set of events that may be written atomically to a data stream and/or (ii) guarantee that either all transaction events are eventually available for reading (or none of the transaction events are available for reading). Further, transactions enable a stream processing job to align a checkpointing process with committing an output, which enables achieving exactly-once processing pipelines (with the coordination (in terms of supporting commits and rollbacks) between the streaming storage system (125) and related computing devices (e.g., 112A, 113, etc., FIG. 1.1) via a two-phase commit protocol).

In one or more embodiments, Edge Device A (110A) may send metadata requests to the controller (162) and may send data requests (e.g., write requests, read requests, create a stream, delete the stream, get the segments, etc.) to the SS (164). With respect to a "write path" (which is primarily driven by a sequential write performance of the logger (166)), the writer component of Edge Device A (110A) may first communicate with the controller (162) to perform a write operation (e.g., appending events/data) and to infer which SS it supposed to connect to. Based on that, the writer component may connect to the SS (164) to start appending data. Thereafter, the SS (164) (more specifically, SCs hosted by the SS) may first write data (synchronously) to the logger (166) (e.g., the "tier-1 storage" of the streaming storage system (which typically executes within the cluster), Apache Bookkeeper, a distributed write-ahead log, etc.) to achieve data durability (e.g., in the presence of small write operations) and low-latency (e.g., <10 milliseconds) before acknowledging the writer component on every data written (so that data may not be lost as data is saved in protected, persistent/temporary storage before the write operation is acknowledged).

Once acknowledged, in an offline process, the SS (164) may group the data (written to the logger (166) into larger chunks and asynchronously move the larger chunks to Long-Term Storage A (140) or Long-Term Storage B (142) (e.g., the "tier-2 storage" of the streaming storage system, pluggable storage, AWS S3, Apache HDFS, Dell Isilon, Dell ECS, object storage, block storage, file system storage, etc.) for high read/write throughput (e.g., to perform batch analytics) (as indicated, Edge Device A (110A) may not directly write to tier-2 storage (e.g., 140, 142, etc.)) and for permanent data storage. For example, Edge Device A may send a data request for storing and processing video data from a surgery in real-time (e.g., performing computations (or real-time analytics) on the video data captured by surgery cameras for providing augmented reality capabilities on the video data to help surgeons, where SC A (165A) may be used for this purpose), and eventually, this data may need to be available (or permanently stored) on a larger information technology (IT) facility that hosts enough storage/memory and compute resources (e.g., for executing batch analytics on historical video data to train ML models, where the video data may be asynchronously available in the tier-2 storage).

Further, with respect to a "read path" (which is isolated from the write path), the reader component of Edge Device A (110A) may first communicate with the controller (162) to perform a read operation and to infer which SS it supposed to connect to (e.g., via its memory cache, the SS (164) may indicate where it keeps the data such that the SS may serve tail of data from the cache). For example, if the data is not cached (e.g., historical data), the SS may pull data from Long-Term Storage A (140) or Long-Term Storage B (142) so that the reader component performs the read operation (as indicated, the SS may not use the logger (166) to serve a read request of the reader component, where the data in the logger may be used for recovery purposes when necessary).

In one or more embodiments, once data is (and/or will be) provided by Edge Device A (110A) to the SS (164), users may desire access to the data managed by the SS. To facilitate provisioning of access to the data, the SS may manage one or more data structures (in conjunction with the logger (166)), such as block chains, that include information, e.g.,: (i) related to data ownership, (ii) related to the data that is managed, (iii) related to users (e.g., data owners), and/or (iv) related to how users may access the stored data. In one or more embodiments, by providing data management services and/or operational management services (in conjunction with the logger) to the users and/or other entities, the SS may enable any number of entities to access data. As part of providing the data management services, the SS may provide (in conjunction with the logger and/or a long-term storage (e.g., 140, 142, etc.)) a secure method for storing and accessing data. By doing so, access to data in the logger may be provided securely while facilitating provisioning of access to the data.

The data management services and/or operational management services provided by the SS (164) (through, for example, its SCs) may include, e.g.,: (i) obtaining data requests and/or data from Edge Device A (110A) (where, for example, Edge Device A performs a data write operation through a communication channel); (ii) organizing and/or writing/storing the "obtained" data (and metadata regarding the data) to the logger (166) to durably store the data; (iii) generating derived data based on the obtained data (e.g., grouping the data into larger chunks by employing a set of linear, non-linear, and/or ML models), (iv) providing/moving the obtained data, derived data, and/or metadata associated with both data to a long-term storage (e.g., 140, 142, etc.); (v) managing when, how, and/or what data Edge Device A may provide; (vi) temporarily storing the obtained data in its cache for serving that data to reader components; and/or (vii) queueing one or more data requests.

In one or more embodiments, as being part of the tiered storage streaming system (e.g., tier-1 (durable) storage), the logger (166) may provide short-term, low-latency data storage/protection while preserving/guaranteeing the durability and consistency of data written to streams. In one or more embodiments, the logger may exist/execute within the cluster. As discussed above, the SS (164) may enable low-latency, fast, and durable write operations (e.g., data is replicated and persisted to disk before being acknowledged) to return an acknowledgement to a writer component (e.g., of Edge Device A (110A)), and these operations may be optimized (in terms of I/O throughput) with the help of the logger.

In one or more embodiments, to add further efficiency, write operations to the logger (166) may involve data from multiple segments, so the cost of persisting data to disk may be amortized over several write operations. The logger may persist the most recently written stream data (to make sure reading from the tail of a stream can be performed as fast as possible), and as data in the logger ages, the data may be moved to Long-Term Storage A (140) or Long-Term Storage B (142) (e.g., a tail of a segment may be stored in tier-1 storage providing low-latency reads/writes, whereas the rest of the segment may be stored in tier-2 storage providing high-throughput read access with near-infinite scale and low-cost). Further, the cluster may use the logger as a coordination mechanism for its components, where the logger may rely on the consensus service (168).

One of ordinary skill will appreciate that the logger (166) may perform other functionalities without departing from the scope of the embodiments disclosed herein. The logger (166) may be implemented using hardware, software, or any combination thereof.

In one or more embodiments, in case of reads, SC A (165A) may have a "read index" that tracks the data read for the related segments, as well what fraction of that data is stored in cache. If a read process (e.g., initiated upon receiving a read request) requests data for a segment that is not cached, the read index may trigger a read process against Long-Term Storage A (140) or Long-Term Storage B (142) to retrieve that data, storing it in the cache, in order to serve Edge Device A (110A).

As used herein, data may refer to a "stream data (or a "stream")" that is a continuous (or continuously generated), unbounded (in size), append-only (e.g., data in a stream cannot be modified but may be truncated, meaning that segments are indivisible units that form the stream), lightweight (e.g., as a file), and durable sequence of bytes (e.g., a continuous data flow/structure that may include data, metadata, and/or the like; a collection of data records called "events", in which there may not be a limit on how many events can be in a stream or how many total bytes are stored in a stream; etc.) generated (in parallel) by one or more data sources (e.g., 110A, 110N, IoT sensors, etc.). In one or more embodiments, by using append-only log data structures (which are useful for serverless computing frameworks while supporting real-time and historical data access), the SS (164) may enable rapid ingestion of information into durable storage (e.g., the logger (166)) and support a large variety of application use cases (e.g., publish/subscribe messaging, NoSQL databases, event-oriented applications, etc.). Further, a writer component may keep inserting events at one end of a stream and a reader component may keep reading the latest ones from there or for historical reads, the reader component may target specific offsets and keep reading from there.

As used herein, serverless computing frameworks/pipelines may refer to FaaS platforms/pipelines, which allow users to focus only on their code and implementation of the code at a large scale without having to worry about the infrastructure and/or resource management. In most cases, FaaS platforms provide reactive approaches to execute functions (i.e., based events) and to enable stateless computations (e.g., when the execution halts, the "serverless" function may not keep anything in memory unless the function wrote the related data to object storage). Due to their stateless and short-lived nature, serverless functions may need to transfer the results of their computations to other functions via an intermediate system.

While for small computations there may be multiple options (e.g., messaging systems, queues, etc.), for data-intensive FaaS pipelines that manage larger amounts of data (e.g., video files, audio files, images, large text files, etc.), the conventional approach is to store intermediate results as objects in object storage. However, the problem with the conventional approach is that there is a mismatch between the design of the pipeline and the storage layer used by it. The pipeline of data-intensive functions may exploit the fact of using data streams as a substrate for improving latency and processing results byte-by-byte. However, using object storage may force a computation step/stage to be completed and store its results as objects (in object storage) for the next step of functions to be triggered. This may induce additional latency that impact on the overall performance of the pipeline. In the case of a failure, using the object storage (as a storage layer for intermediate function results) may provide no mechanism for guaranteeing exactly-once semantics in the pipeline. That this, if there is a failure in the execution of the pipeline, data may be processed twice or some data may be missed to generate the result, and one or more embodiments disclosed herein advantageously overcome these issues.

Continuing with the discussion of FIG. 1.2, an event may be a collection of bytes within a stream (or a contiguous set of related extents of unbounded, continuously generated data) (e.g., a small number of bytes including a temperature reading from an IoT sensor composed of a timestamp, a metric identifier, and a value; web data associated with a user click on a website; a timestamped readout from one sensor of a sensor array; etc.). Said another way, events (which are atomic) may be appended to segments of a data stream (e.g., a stream of bytes), where segments are the unit of storage of the data stream (e.g., a data stream may be comprised of one or more segments, where (i) each segment may include one or more events (where a segment may not store events directly, the segment may store the append-only sequence of bytes of the events) and (ii) events may be appended to segments by serializing them into bytes, where once written, that sequence of bytes is immutable). In one or more embodiments, events may be stored along a data stream in parallel to one another and/or in succession to one another (where segments may provide parallelism). That is, one or more events may have data occurring in parallel, or having occurred in parallel. Further, one or more events may sequentially follow one or more other events, such as having data that occurs after one or more other events, or has occurred after data from one or more other events.

In one or more embodiments, the number of segments for appending and/or truncating (e.g., the oldest data from a stream without compromising with the data format) may vary over a respective unit axis of a data stream. It will be appreciated that a data stream may be represented relative to a time axis. That is, data and/or events may be written to and/or appended to a stream continuously, such as in a sequence or in an order. Likewise, such data may be reviewed and/or analyzed by a user in a sequence or in an order (e.g., a data stream may be arranged based upon a predecessor-successor order along the data stream).

Sources of data written, posted, and/or otherwise appended to a stream may include, for example (but not limited to): online shopping applications, social network applications (e.g., producing a stream of user events such as status updates, online transactions, etc.), IoT sensors, video surveillance cameras, drone images, autonomous vehicles, servers (e.g., producing a stream of telemetry information such as CPU utilization, memory utilization, etc.), etc. The data from streams (and thus from the various events appended to the streams) may be consumed, by ingesting, reading, analyzing, and/or otherwise employing in various ways (e.g., by reacting to recent events to analyze historical stream data).

In one or more embodiments, an event may have a routing key, which may be a string that allows the streaming storage system (125) and/or administrators to determine which events are related (and/or which events may be grouped) (e.g., when working with data streams having parallel segments, applications requiring total order of events are expected to use routing keys for writing data). A routing key may be derived from data, or it may be an artificial string (e.g., a universally unique identifier) or a monotonically increasing number. For example, a routing key may be a timestamp (to group events together by time), or an IoT sensor identifier (to group events by a machine). In one or more embodiments, a routing key may be useful to define precise read/write semantics. For example, (i) events with the same routing key may be consumed in the order they were written and (ii) events with different routing keys sent to a specific reader will always be processed in the same order even if that reader backs up and re-reads them.

As discussed above, the streaming storage system (125) (e.g., an open-source, distributed and tiered streaming storage system providing a cloud-native streaming infrastructure (i) that is formed by controller instances and SS instances, (ii) that eventually stores stream data in a long-term storage (e.g., 140, 142, etc.), (iii) that enables auto-scaling of streams (where a degree of parallelism may change dynamically in order to react workload changes) and its connection with serverless computing, and (iv) that supports both a byte stream (allowing data to be access randomly by any byte offset) and an event stream (allowing parallel writes/reads)) may store and manage/serve data streams, in which the "stream" abstraction in the streaming storage system is a first-class primitive for storing continuous and unbounded data. A data stream in the streaming storage system guarantees strong consistency and achieves good performance (with respect to data storage and management), and may be combined with one or more stream processing engines (e.g., Apache Flink) to initiate streaming applications.

In one or more embodiments, Edge Device A (110A) may concurrently have dynamic write/read access to a stream where other clients (using the streaming storage system (125)) may be aware of all changes being made to the stream. The SS (164) may track data that has been written to the stream. Edge Device A may update the stream by sending a request to the SS that includes the update and a total length of the stream that was written at the time of a last read update by Edge Device A. If the total length of the stream received from Edge Device A matches the actual length of the stream maintained by the SS, the SS may update the stream. If not, a failure message may be sent to Edge Device A and Edge Device A may process more reads to the stream before making another attempt to update the stream.

In one or more embodiments, Edge Device A (110A) may provide a client library that may implement an API for the writer and reader components to use (where an application may use the API to read and write data from and to the storage system). The client library may encapsulate a protocol used for a communication between Edge Device A and the streaming storage system (e.g., the controller (162), the SS (164), etc.). As discussed above, (i) a writer component may be an application that generates events/data and writes them into a stream, in which events may be written by appending to the tail (e.g., front) of the stream; (ii) a reader component may be an application that reads events from a stream, in which the reader component may read from any point in the stream (e.g., a reader component may be reading events from a tail of a stream); and (iii) events may be delivered to a reader component as quickly as possible (e.g., events may be delivered to a reader component within tens of milliseconds after they were written).

In one or more embodiments, segments may be illustrated as "Sn" with n being, for example, one through ten. A low number n indicates a segment location closer to a stream head and a high number n indicates a segment location closer to a stream tail. In general, a stream head refers to the smallest offsets of events that have no predecessor (e.g., the beginning of a stream, the oldest data, etc.). Such events may have no predecessor because either such events are the first events written to a stream or their predecessors have been truncated. Likewise, a stream tail refers to the highest offsets of events of an open stream that has no successor (e.g., the most recently written events and/or last events, the end of a stream where new events are appended, etc.). In one or more embodiments, a segment may be (i) an "open segment" indicating that a writer component may write data to that segment and a reader component may consume that data at a later point-in-time, and (ii) a "sealed/immutable segment" indicating that the segment is read-only (e.g., which may not be appended).

In one or more embodiments, a reader component may read from earlier parts (or at an arbitrary position) of a stream (referred to as "catch-up reads", where catch-up read data may be cached on demand) and a "position object (or simply a "position")" may represent a point in the stream that the reader component is currently located.

As used herein, a "position" may be used as a recovery mechanism, in which an application (of Edge Device A (110A)) that persist the last position of a "failed" reader component that has successfully processed may use that position to initialize a replacement reader to pick up where the failed reader left off. In this manner, the application may provide exactly-once semantics (e.g., exactly-once event processing) in the case of a reader component failure.

In one or more embodiments, multiple reader components may be organized into one or more RGs, in which an RG may be a named collection of readers that together (e.g., in parallel, simultaneously, etc.) read events from a given stream. Each event published into a stream may be guaranteed to be sent to one reader component within an RG. In one or more embodiments, an RG may be a "composite RG" or a "distributed RG", where the distributed RG may allow a distributed application to read and process data in parallel, such that a massive amount of data may be consumed by a coordinated fleet of reader components in that RG. A reader (or a reader component) in an RG may be assigned zero or more stream segments from which to read (e.g., a segment is assigned to one reader in the RG, which gives the "one segment to one reader" exclusive access), in which the number of stream segments may be balanced to which the reader is assigned. For example, the reader may read from two stream segments while another reader in the RG may only read one stream segment.

In one or more embodiments, reader components may be added to an RG, or reader components fail and may be removed from the RG, and a number of segments in a stream may determine the upper bound of "read" parallelism of readers/reader components within the RG. Further, an application (of Edge Device A (110A)) may be made aware of changes in segments (via the SS (164)). For example, the application may react to changes in the number of segments in a stream (e.g., by adjusting the number of readers in an associated RG) to maintain maximum read parallelism if resources allow.

In one or more embodiments, events may be appended to a stream individually, or may be appended as a stream transaction (no size limit), which is supported by the streaming storage system (125). As used herein, a "transaction" refers to a group/set of multiple events (e.g., a writer component may batch up a bunch of events in the form of a transaction and commit them as a unit into a stream). For example, when the controller (162) invokes committing a transaction (e.g., as a unit into a stream), the group of events included in the transaction may be written (via the writer component) to a stream as a whole (where the transaction may span multiple segments of the stream) or may be abandoned/discarded as a whole (e.g., if the writer component fails). With the use of transactions, a writer component may persist data at a point-in-time, and later decide whether the data should be appended to a stream or abandoned. In one or more embodiments, a transaction may be implemented similar to a stream, in which the transaction may be associated with multiple segments and when an event is published into the transaction, (i) the event itself is appended to a segment of the transaction (where data written to the transaction is just as durable as data written directly to a stream) and (ii) the event may not be visible to a reader component until that transaction is committed. Further, an application may continuously produce results of a data processing operation and use the transaction to durably accumulate the results of the operation.

In one or more embodiments, as being a stateless component, the controller (162) may (further) include functionality to, e.g,: (i) manage the lifecycle of a stream and/or transactions, in which the lifecycle of the stream includes features such as generation, scaling, modification, truncation, and/or deletion of a stream (in conjunction with the SS (164)); (ii) manage a retention policy for a stream that specifies how the lifecycle features are implemented (e.g., requiring periodic truncation); (iii) manage transactions (e.g., generating transactions (e.g., generating transaction segments), committing transactions (e.g., merging transaction segments), aborting transactions (e.g., dropping a transaction segment), etc.); (iv) be dependent on stateful components (e.g., the consensus service (168), the logger (166) (for the write-ahead log functionalities)); (v) manage (and authenticate) metadata requests (e.g., get information about a segment, get information about a stream, etc.) received from Edge Device A (110A) (e.g., manage stream metadata); (vi) be responsible for distribution/assignment of SCs into one or more SSs executing on the streaming storage system (125) (e.g., if a new SS (or a new SS instance) is added to the streaming storage system, the controller may perform a reassignment of SCs along all existing SSs to balance/split the workload); (vii) be responsible for making sense of segments; (viii) manage/enforce an auto-scaling policy for a stream that allows the streaming storage system to automatically change the segment parallelism of a data stream based on an ingestion workload (e.g., events/bytes per second); and/or (ix) manage a control plane of the streaming storage system (125).

In one or more embodiments, although data streams are typically unbounded, truncating them may be desirable in practical real-world scenarios to manage the amount of storage space the data of a stream utilizes relative to a stream storage system. This may particularly be the case where storage capacity is limited. Another reason for truncating data streams may be regulatory compliance, which may dictate an amount of time an application retains data.

In one or more embodiments, a stream may dynamically change over time and, thus, metadata of that stream may change over time as well. Metadata of a stream may include (or specify), for example (but not limited to): configuration information of a segment, history of a segment (which may grow over time), one or more scopes, transaction metadata, a logical structure of segments that form a stream, etc. The controller (162) may store metadata of streams (which may enable exactly-once semantics) in a table segment, which may include an index (e.g., a B+ tree index) built on segment attributes (e.g., key-value pairs associated to segments). In one or more embodiments, the corresponding "stream metadata" may further include, for example, a size of a data chunk stored in a long-term storage (e.g., 140, 142, etc.) and an order of data in that data chunk (for reading purposes and/or for batch analytics purposes at a later point-in-time).

As used herein, a "scope" may be a string and may convey information to a user/administrator for the corresponding stream (e.g., "FactoryMachines"). A scope may act as a namespace for stream identifiers (e.g., as folders do for files) and stream identifiers may be unique within a scope. Further, a stream may be uniquely identified by a combination of its stream identifier and scope. In one or more embodiments, a scope may be used to separate identifiers by tenants (in a multi-tenant environment), by a department of an organization, by a geographic location, and/or any other categorization a user selects.

One of ordinary skill will appreciate that the controller (162) may perform other functionalities without departing from the scope of the embodiments disclosed herein. The controller (162) may be implemented using hardware, software, or any combination thereof.

In one or more embodiments, as being a stateless component, the SS (164) may (further) include functionality to, e.g,: (i) manage the lifecycle of segments (where the SS may be unaware of streams but may store segment data); (ii) generate, merge, truncate, and/or delete segments, and serve read/write requests received from Edge Device A (110A); (iii) use both a durable log (e.g., 166) and a long-term storage (e.g., 140, 142, etc.) to store data and/or metadata; (iv) append new data to the durable log synchronously before responding to Edge Device A, and write data asynchronously to the long-term storage (which is the primary destination of data); (v) use its cache to serve tail stream reads, to read ahead from the long-term storage, and/or to avoid reading from the durable log when writing to the long-term storage; (vi) monitor the rate of event traffic in each segment individually to identify trends and based on these trends, associate a trend label (described below) with the corresponding segment; (vii) make sure that each segment maps to only one SC (via a hash function) at any given time, in which that SS instance may maintain metadata (e.g., a rate of traffic into the related segment locally, a scaling type, a target rate, etc.); (viii) in response to a segment being identified as being either hot or cold, the hot/cold segment state is communicated to a central scaling coordinator component of the controller (162) (in which that component consolidates the individual hot/cold states of multiple segments and calculates a centralized auto-scaling decision for a stream such as by replacing hot segments with multiple new segments and/or replacing multiple cold segments with a consolidated newer segment); (ix) be dependent on stateful components (e.g., the consensus service (168), the logger (166) (for the write ahead log functionalities)); (x) manage data paths (e.g., a write path, a read path, etc.); (xi) manage (and authenticate) data requests received from Edge Device A; and/or (xii) manage a data plane of the streaming storage system (125) (e.g., implement read, write, and other data plane operations).

One of ordinary skill will appreciate that the SS (164) may perform other functionalities without departing from the scope of the embodiments disclosed herein. The SS (164) may be implemented using hardware, software, or any combination thereof.

In one or more embodiments, a trend label may have one of three values, e.g., "normal", "hot", or "cold". A segment identified as "hot" may be characterized by a traffic trend that is greater than a predetermined target rate of traffic. The target rate may be supplied by a user via predetermined a stream policy (e.g., a stream/scaling policy may be defined on a data stream such that if a segment gets more than the required number of events, it may be divided). A segment identified as "cold" may be characterized by a traffic trend that is less than the target traffic rate. For example, a hot segment may be a candidate for scale-up into two or more new segments (e.g., Segment 2 being split into Segment 4 and Segment 5). As yet another example, a cold segment may be a candidate for scale-down via merger with one or more other cold segments (e.g., Segment 4 and Segment 5 being merged into Segment 6). As yet another example, a normal segment may be a candidate for remaining as a single segment.

In one or more embodiments, a consensus service may be required to have/keep a consistent view/state of a current SC distribution/assignment across the streaming storage systems (executing on the system (e.g., 100, FIG. 1.1)). For example, identifiers of SCs and their assignments may need to be consistent across the streaming storage systems and one way to achieve this is implementing the consensus service. To this end, the consensus service (168) (e.g., Apache Zookeeper) may include functionality to, e.g.,: (i) perform one or more coordination tasks (e.g., helping to the controller (162) for the assignment/distribution of SCs to SS instances, helping a split of workloads across segments, etc.), and/or (ii) store no stream metadata.

One of ordinary skill will appreciate that the consensus service (168) may perform other functionalities without departing from the scope of the embodiments disclosed herein. The consensus service (168) may be implemented using hardware, software, or any combination thereof.

In one or more embodiments, SC A (165A) and SC B (165B) may allow users and/or applications to read/access data that was written in SC A and SC B and stored in a long-term storage (e.g., 140, 142, etc.) at the background. In one or more embodiments, SC A and SC B may be useful to perform an active-passive data replication. For example, SC A and SC B are writing data and at the same time, SS A and SS B may serve batch analytics tasks (e.g., batch reads) of data processing applications (of Edge Device A (110A)) (for example, for a better user experience).

Further, the embodiment provided in FIG. 1.2 may utilize the inherent capabilities of the streaming storage system (125) to move data to a long-term storage (e.g., 140, 142, etc.) jointly with the SCs (e.g., 165A, 165B, etc.) as a form of active-passive data replication, which is useful for various analytics workloads. For example, a user (of Edge Device A (110A)) may perform real-time analytics on stream data (with the help of the logger (166), where the logger may persist the most recently written stream data) and at the same time, the related SCs (e.g., SC A, SC B, etc.) may move the data progressively to the long-term storage (e.g., 140, 142, etc.) (i) for serving batch reads/analytics at a later point-in-time (for example, upon receiving a batch read request from the user) and (ii) for enabling storage tiering capabilities provided by the streaming storage system (e.g., to perform active-passive data replication).

In one or more embodiments, as being part of the tiered storage streaming system (e.g., tier-2 storage), Long-Term Storage A (140) may provide long-term (e.g., near-infinite retention), durable, high read/write throughput (e.g., to perform batch analytics; to perform generate, read, write, and delete operations; erasure coding; etc.) historical stream data storage/protection with near-infinite scale and low-cost. Long-Term Storage A (140) may be, for example (but not limited to): pluggable storage, AWS S3, Apache HDFS, Dell Isilon, Dell ECS, object storage, block storage, file system storage, etc. Referring to FIG. 1.2, Long-Term Storage A (140) may be located/deployed outside of the streaming storage system (125), in which asynchronous migration of events from tier-1 storage to tier-2 storage (without affecting the performance of tail reads/writes) may reflect different access patterns to stream data.

In one or more embodiments, Long-Term Storage A (140) may be a fully managed cloud (or local) storage that acts as a shared storage/memory resource that is functional to store unstructured and/or structured data. Further, Long-Term Storage A (140) may also occupy a portion of a physical storage/memory device or, alternatively, may span across multiple physical storage/memory devices.

In one or more embodiments, Long-Term Storage A (140) may be implemented using physical devices that provide data storage services (e.g., storing data and providing copies of previously stored data). The devices that provide data storage services may include hardware devices and/or logical devices. For example, Long-Term Storage A (140) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, Long-Term Storage A (140) may include a memory device (e.g., a dual in-line memory device), in which data is stored and from which copies of previously stored data are provided. As yet another example, Long-Term Storage A (140) may include a persistent storage device (e.g., an SSD), in which data is stored and from which copies of previously stored data is provided. As yet another example, Long-Term Storage A (140) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, Long-Term Storage A (140) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, Long-Term Storage A (140) may store/log/record unstructured and/or structured data that may include (or specify), for example (but not limited to): a valid (e.g., a granted) request and its corresponding details, an invalid (e.g., a rejected) request and its corresponding details, historical stream data and its corresponding details, content of received/intercepted data packets/chunks, information regarding a sender (e.g., a malicious user, a high priority trusted user, a low priority trusted user, etc.) of data, information regarding the size of intercepted data packets, a mapping table that shows the mappings between an incoming request/call/network traffic and an outgoing request/call/network traffic, a cumulative history of user activity records obtained over a prolonged period of time, a cumulative history of network traffic logs obtained over a prolonged period of time, previously received malicious data access requests from an invalid user, a backup history documentation of a workload, a model name of a hardware component, a version of an application, a product identifier of an application, an index of an asset (e.g., a file, a folder, a segment, etc.), recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by the controller (162), power consumption of components of the streaming storage system (125), etc.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the unstructured and/or structured data may be maintained by, for example, the cloud device (e.g., 113, FIG. 1.1). The cloud device may add, remove, and/or modify those data in Long-Term Storage A (140) to cause the information included in Long-Term Storage A (140) to reflect the latest version of, for example, SLAs. The unstructured and/or structured data available in Long-Term Storage A (140) may be implemented using, for example, lists, tables, unstructured data, structured data, etc. While described as being stored locally, the unstructured and/or structured data may be stored remotely, and may be distributed across any number of devices without departing from the scope of the embodiments disclosed herein.

While Long-Term Storage A (140) has been illustrated and described as including a limited number and type of data, Long-Term Storage A (140) may store additional, less, and/or different data without departing from the scope of the embodiments disclosed herein. In the embodiments described above, Long-Term Storage A (140) is demonstrated as a separate entity; however, embodiments herein are not limited as such. In one or more embodiments, Long-Term Storage A (140) may be a part of a cloud environment.

In one or more embodiments, as being a physical computing device or a logical computing device, Long-Term Storage B (142) may provide less, the same, or more functionalities and/or services (described above) comparing to Long-Term Storage A (140).

Referring to FIG. 1.2, as exposed "transparently" to the streaming storage system (125) (where the streaming storage system provides "unbounded" stream abstraction, which is internally split into "bounded" segments/partitions) via the interface (117), the stream tiering proxy (described above in reference to FIG. 1.1) may behave as an API of an external storage service (e.g., 140, 142, etc.) for offloading/tiering/storing, for example, cold stream data (e.g., data chunks of a stream such as Stream A data chunks, Stream B data chunks, etc.). With this way, the framework may exploit data management opportunities that reside in the space between the streaming storage system (125) (initiating/performing stream data tiering) and the external storage service (e.g., 140, 142, etc.) (that stores a portion of stream data).

Referring to FIG. 1.1, a user/administrator may define one or more data management policies (e.g., user-defined data management policies) to execute storage functions (e.g., serverless functions) on specific storage tiering operations/flows related to a stream (or stream data) (e.g., storage functions to be executed on tiered data streams). In one or more embodiments, a user-defined data management policy can be defined via a simple domain specific language (e.g., "for Stream A data chunks, execute Function F", "for Stream B data chunks, execute Function Y", etc.), for example, to make the management of storage functions natural to a related user/administrator. If the policy is defined (by an administrator) on a particular stream, the stream tiering proxy (e.g., the related managers of the proxy) may execute one or more related functions on specific data chunks of that stream.

In one or more embodiments, the framework may consider multiple types of storage functions (e.g., deployed to one or more managers (e.g., 111A-111E)) to be executed on storage operations of tiered streams (or tiered stream data), for example (but not limited to): content management related functions (e.g., data compression functions, data deduplication functions, data encryption/decryption functions, functions that can modify/change the contents of storage operations, etc.), data routing related functions (e.g., functions that decide where to route data based on its privacy/confidentiality details, content, etc.), performance related functions (e.g., data caching functions, data prefetching functions, functions that forecast workloads for better performance, functions that can inspect contents of a storage request and react based on the contents such as embedding generation functions, etc.), etc. Such storage functions can be composed in pipelines that perform multiple transformations on storage operations of tiered data streams (e.g., upon receiving Stream A data chunks, first analyze the data chunks by employing Function A to obtain pre-processed data chunks, then analyze the pre-processed data chunks by employing Function R to obtain deduplicated data chunks).

Referring to FIG. 1.1, the framework may allow custom deployment of manager instances (e.g., 111B-111E) across the heterogeneous infrastructure (or across the cloud-Edge continuum) (e.g., 100, FIG. 1.1) to execute storage functions in the best location (in terms of, at least, performance and efficiency), such as Manager A (111A) can be deployed to Edge Device A (110A) (e.g., a prefetching function being executed by Manager A may bring data to Edge Device A for the streaming storage system (125), in which this function may bring data from an external storage (e.g., 140, 142, etc.) in advance, so when the streaming storage system need the data, the data will be available for use) and Manager E (111E) can be deployed to the cloud device (113) (e.g., a function that executes ML models (to generate vector embeddings from stream data chunks) may be executed by Manager E on the cloud device because of the cloud device's computing resource capabilities), in which each manager may communicate with each other based on the metadata (described above). This would allow users/administrators to execute functions (e.g., caching functions, prefetching functions, etc.) that can exploit locality of the streaming storage system (125) at the Edge, whereas executing other storage functions on specialized hardware component (e.g., GPUs, DPUs, hardware accelerators, etc.) of the cloud device (113). Said another way, the stream tiering proxy (via one or more managers) may be able to deploy specific storage functions to computing devices (e.g., edge devices, edge nodes, cloud devices, etc.) that best matches the execution requirements of those functions (e.g., computing resources required to execute Function A).

Referring to FIG. 1.2, the framework may observe that the streaming storage system (125) is offloading data chunks of tiered data streams and then intercepted the offloading (or the offloading process) by the stream tiering proxy. As discussed above, this can be achieved by exposing a representational state transfer (REST) endpoint (with an API (e.g., 117)) for the streaming storage system (125) to offload stream data, in which one or more "manager" instances of the stream tiering proxy (e.g., exposed as a service) can handle storage requests (e.g., REST storage requests) initiated from the streaming storage system (125).

In one or more embodiments, the framework (e.g., a related manager) may exploit a header of an intercepted storage request to identify the streaming deployment related to the request, as well as the identifier of a related stream to which the storage operation (e.g., the data tiering operation) belongs to. Once a storage operation for a tiered data stream hits one of the managers (e.g., 111A), that instance may check the metadata (that is part of the stream tiering proxy), which is shared across all the managers (e.g., manager instances).

As described above, one of the functionalities of the framework (e.g., the stream tiering proxy) is to transparently intercept storage operations (e.g., initiated via storage requests) from the streaming storage system (125) tiering stream data to an external storage (e.g., 140, 142, etc.). To this end, the stream tiering proxy implements one or more APIs (e.g., 117) of the external storages required to intercept storage requests. Moreover, the stream tiering proxy exposes an endpoint (e.g., 117) that is expected by the streaming storage system (125), so there is virtually no difference in offloading data to the stream tiering proxy or to the long-term storage (e.g., 140, 142, etc.).

Further, the framework (e.g., the stream tiering proxy) may implement, for instance, multiple object storage protocols (for different types of long-term storages) and decide whether specific data streams or data chunks within a stream need to go to a specific long-term storage (e.g., 140, 142, etc.) for any kind of reasons determined by a user (and specified in the related user-defined data management policy). This can be implemented via a storage function (e.g., executing on a related manager) that determines the locations of stream data chunks and routes them to the correct storage locations (e.g., 140, 142, etc.).

FIG. 2 shows a method for managing a data stream (e.g., a method to handle data tiering requests and related data management/storage operations (based on the requests)) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2, the method shown in FIG. 2 may be executed by, for example, the above-discussed stream tiering proxy (e.g., a manager of the stream tiering proxy such as Manager A (e.g., 111A, FIG. 1.2)). Other components of the system (100) illustrated in FIG. 1.1 may also execute all or part of the method shown in FIG. 2 without departing from the scope of the embodiments disclosed herein.

In Step 200, the manager transparently intercepts a data tiering/storage request (e.g., of a cloud storage API) from the streaming storage system (e.g., 125, FIG. 1.2) that wants to initiate a data (e.g., stream data) offloading/tiering operation to a long-term storage (e.g., 140, 142, etc.), in which the data tiering request was intended to be sent to the long-term storage (but stopped by/at the manager). Said another way, the data tiering request originated from the streaming storage system that specifies a data tiering operation.

In one or more embodiments, the request may be triggered "indirectly" by a user of an edge device (e.g., Edge Device A (e.g., 110A, FIG. 1.2)), in which, at first, the user may upload one or more data packets/chunks to the streaming storage system (via Edge Device A) and then the streaming storage system may need to tier/store those data packets (which are part of a stream) to a second long-term storage (e.g., 142, FIG. 1.2) instead of a first long-term storage (e.g., 140, FIG. 1.2), based on the user's request, for example, to provide, at least, (i) optimal level of data integrity and availability among all geographically distributed data centers of a related organization (with almost zero downtime on operations and/or interruption in service) and (ii) a better user experience to one or more users of those data centers. In one or more embodiments, the first long-term storage may be a private storage executing in a private environment (e.g., controlled by a specific section of the organization) and the second long-term storage may be a public storage executing in a public environment.

In Step 202, by employing a set of linear, non-linear, and/or ML models (e.g., an ML-based inference model), the manager analyzes the request (intercepted in Step 200), based on a user-defined data management policy (discussed above in reference to FIGS. 1.1-1.2), to obtain an analysis result. In one or more embodiments, the analysis result may specify, for example (but not limited to), information about the contents of data chunks (containing multiple events) of a related stream (which corresponds to the intercepted request) indicating, for example, whether or not the data chunks include potentially private details.

In Step 204, based on the analysis result (obtained in Step 202) and metadata (described above in reference to FIG. 1.1), the manager identifies one or more functions (e.g., being employed internally or by another manager(s)) that need to process data chunks of the stream before performing the data tiering operation.

For example, in a first use case, the manager may identify that a first function and a second function that need to process data chunks of the stream before performing the data tiering operation, in which the first function compresses given data chunks to obtain processed data chunks and the second function identifies where the processed data chunks need to be tiered. Thereafter, based on the identifying, the manager may determine that the first function and the second function are available internally (e.g., on the manager). Based on this determination, the manager may continue performing the remaining steps of the method.

As yet another example, in a second use case, the manager may identify that a first function and a second function that need to process data chunks of the stream before performing the data tiering operation, in which the first function deduplicates given data chunks to obtain deduplicated data chunks and the second function classifies given deduplicated data chunks. Thereafter, based on the identifying, the manager may determine that the first function is available internally (e.g., on the manager) and the second function is not available internally (e.g., available on a second manager (e.g., an instance of the manager) being executed on the cloud device (e.g., 113, FIG. 1.1) because the cloud device has the required amount of computing resources for the second manager to execute the second function). Based on this determination, the manager may continue performing the remaining steps of the method.

In one or more embodiments, via a related manager(s), an edge device, an edge node, or a cloud device may execute any suitable function (e.g., a first function, a second function, etc.), in which, referring to FIG. 1.1, (i) edge devices, edge nodes, and the cloud device form a heterogeneous environment, (ii) edge devices, edge nodes, the cloud device, the first long-term storage, and the second long-term storage are connected to each other over the network (130), (iii) the manager may be hosted by an edge device, a second manager may be hosted by an edge node, a third manager may be hosted by the cloud device, and the second manager and the third manager may be instances of the manager, and (iv) the manager, the second manager, and the third manager may form the stream tiering proxy.

In Step 205, based on the identifying performed in Step 204, the manager makes a determination (in real-time or near real-time) as to whether the functions are available on the manager (e.g., as to whether the first and second functions are available internally). Accordingly, in one or more embodiments, if the result of the determination is YES (indicating that the computing device (e.g., an edge device, an edge node, etc.) where the manager is being hosted has enough computing resources for the manager to execute the functions), the method proceeds to Step 206. If the result of the determination is NO (indicating that the computing device (e.g., an edge device, an edge node, etc.) where the manager is being hosted have not enough computing resources for the manager to execute at least a portion of the functions), the method alternatively proceeds to Step 212.

In Step 206, as a result of the determination in Step 205 being YES and based on the policy (which may include parameters to manage a coordinated behavior of each function with the data chunks), the manager processes (e.g., using a first function) the data chunks to obtain processed data chunks. Thereafter, using a second function, the manager identifies that the processed data chunks need to be tiered to the first long-term storage.

In Step 208, after identifying that the processed data chunks need to be tiered to the first long-term storage, the manager may perform the data tiering operation by: (i) tiering/storing the processed data chunks to a relevant long-term storage (e.g., the first long-term storage) (as part of Step 208) and (ii) notifying, once the processed data chunks are stored to the storage and as a response to the request (intercepted in Step 200), the streaming storage system that the data tiering operation is completed (as part of Step 210). Thereafter, for example, the streaming storage system, via a GUI of Edge Device A, may notify the user that the data tiering operation of the data chunks is completed. In one or more embodiments, the method may end following Step 210.

In Step 212, as a result of the determination in Step 205 being NO and based on the policy, the manager processes (e.g., using a first function) the data chunks to obtain, for example, pre-processed data chunks (e.g., deduplicated data chunks). Thereafter, in Step 214, the manager routes/sends the pre-processed data chunks to an entity (e.g., an edge node, the cloud device, etc.) that executes (or can execute based on its available computing resources) a related function(s) (e.g., a second function) that further process the pre-processed data chunks to obtain processed data chunks. In one or more embodiments, the second function may further process the deduplicated data chunks to obtain the classified data chunks (e.g., the processed data chunks).

In Step 216, the manager receives a notification from the entity (where the second function is being executed by a second manager on the entity) specifying that the processed data chunks are obtained and the processed data chunks are tiered to the first long-term storage. In Step 218, upon receiving the notification and as a response to the request (intercepted in Step 200), the manager notifies the streaming storage system that the data tiering operation is completed. Thereafter, for example, the streaming storage system, via a GUI of Edge Device A, may notify the user that the data tiering operation of the data chunks is completed. In one or more embodiments, the method may end following Step 218.

In one or more embodiments, the manager may intercept a second data tiering request originated from the streaming storage system that specifies a second data tiering operation. By following the steps discussed above, the manager may analyze the second request based on the policy to obtain a second analysis result. The manager may then identify, based on the second analysis result and the function metadata, a third function and a fourth function that need to process second data chunks of the stream before performing the second data tiering operation, in which, for example, the third function may deduplicate given second data chunks to obtain deduplicated data chunks and the fourth function may classify given deduplicated data chunks to obtain classified data chunks.

Further, the manager may make, based on the identifying, a second determination that the third function is available on the manager and the second function is not available on the manager. Based on the second determination, the manager may: (i) process, using the third function and the policy, the second data chunks to obtain the deduplicated data chunks and (ii) send the deduplicated data chunks to an entity that executes the fourth function, in which the fourth function may further process the deduplicated data chunks to obtain the classified data chunks. The manager may then receive a notification from the fourth function that is being executed by a second manager on the entity, in which the notification may specify that the classified data chunks are tiered to the first long-term storage. Finally, the manager may notify, upon receiving the notification, the streaming storage system that the second data tiering operation is completed.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a stream, the method comprising:
    intercepting, by a manager, a first data tiering request originated from a streaming storage system that specifies a data tiering operation;
    analyzing the first request based on a user-defined data management policy to obtain an analysis result;
    identifying, based on the analysis result and function metadata, a first function and a second function that need to process data chunks of the stream before performing the data tiering operation,
        wherein the first function compresses the data chunks to obtain processed data chunks,
        wherein the second function identifies where the processed data chunks need to be tiered;
    making, based on the identifying, a determination that the first function and the second function are available on the manager;
    processing, using the first function, and based on the determination and the policy, the data chunks to obtain the processed data chunks;
    identifying, using the second function, that the processed data chunks need to be tiered to a first long-term storage;
    after identifying that the processed data chunks need to be tiered to the first long-term storage, performing the data tiering operation by:
        tiering the processed data chunks to the first long-term storage; and
        notifying, once the processed data chunks are tiered to the first long-term storage, the streaming storage system that the data tiering operation is completed.

2. The method of claim 1, wherein the first request specifies that the data chunks of the stream need to be tiered to a second long-term storage instead of the first long-term storage.

3. The method of claim 2,
    wherein the first long-term storage is a private storage executing in a private environment, and
    wherein the second long-term storage is a public storage executing in a public environment.

4. The method of claim 1,
    wherein an edge device, an edge node, or a cloud device executes the first function and the second function,
    wherein the edge device, the edge node, and the cloud device form a heterogeneous environment, and
    wherein the edge device, the edge node, the cloud device, the first long-term storage, and a second long-term storage are connected to each other over a network.

5. The method of claim 4,
    wherein the manager is hosted by the edge device,
    wherein a second manager is hosted by the edge node,
    wherein a third manager is hosted by the cloud device, and
    wherein the second manager and the third manager are instances of the manager.

6. The method of claim 5,
    wherein the manager, the second manager, and the third manager form a stream tiering proxy, and
    wherein the proxy is exposed as a service to the streaming storage system.

7. The method of claim 1,
    wherein the stream is a continuous, unbounded, append-only, and durable sequence of bytes, and
    wherein a controller of the streaming storage system manages the stream.

8. The method of claim 7,
    wherein the streaming storage system comprises a tier-1 storage,
    wherein the tier-1 storage is a distributed write-ahead log providing short-term, durable, and low-latency data protection of the stream,
    wherein the streaming storage system is operatively connected to a tier-2 storage,
    wherein the tier-2 storage is the first long-term storage, and wherein the first long-term storage is a pluggable object storage providing long-term and durable data protection of the stream.

9. The method of claim 1, wherein the policy dictates when and how the first function and the second function are allowed to process a set of data chunks of the stream.

10. The method of claim 9,
wherein the policy comprises parameters to manage a coordinated behavior of each of the first function and the second function with the data chunks, and
wherein each of the first function and the second function is a Function-as-a-Service (FaaS) function.

11. The method of claim 1,
wherein metadata comprises the function metadata and the user-defined data management policy, and
wherein the function metadata specifies computing resource capabilities of an edge device that hosts the first function and the second function, an identifier of the first function, an identifier of the second function, a type of the first function, a type of the second function, computing resources required to execute the first function, and computing resources required to execute the second function.

12. The method of claim 11, wherein the first function becomes aware of the second function based on the function metadata.

13. The method of claim 1, the method further comprising:
intercepting, by the manager, a second data tiering request originated from the streaming storage system that specifies a second data tiering operation;
analyzing the second request based on the policy to obtain a second analysis result;
identifying, based on the second analysis result and the function metadata, a third function and a fourth function that need to process second data chunks of the stream before performing the second data tiering operation,
wherein the third function deduplicates the second data chunks to obtain deduplicated data chunks,
wherein the fourth function classifies the deduplicated data chunks to obtain classified data chunks;
making, based on the identifying, a second determination that the third function is available on the manager and the second function is not available on the manager;
based on the second determination:
processing, using the third function and the policy, the second data chunks to obtain the deduplicated data chunks;
sending the deduplicated data chunks to an entity that executes the fourth function, wherein the fourth function further processes the deduplicated data chunks to obtain the classified data chunks;
receiving a notification from the fourth function that is being executed by a second manager on the entity,
wherein the notification specifies that the classified data chunks are tiered to the first long-term storage; and
notifying, upon receiving the notification, the streaming storage system that the second data tiering operation is completed.

14. A method for managing a stream, the method comprising:
intercepting, by a manager, a data tiering request originated from a streaming storage system that specifies a data tiering operation;
analyzing the request based on a user-defined data management policy to obtain an analysis result;
identifying, based on the analysis result and function metadata, a first function and a second function that need to process data chunks of the stream before performing the data tiering operation;
wherein the first function deduplicates the data chunks to obtain deduplicated data chunks,
wherein the second function classifies the deduplicated data chunks to obtained classified data chunks;
making, based on the identifying, a determination that the first function is available on the manager and the second function is not available on the manager;
processing, using the first function, and based on the determination and the policy, the data chunks to obtain deduplicated data chunks;
sending the deduplicated data chunks to an entity that executes the second function,
wherein the second function further processes the deduplicated data chunks to obtain the classified data chunks;
receiving a notification from the second function that is being executed by a second manager on the entity,
wherein the notification specifies that the classified data chunks are tiered to a first long-term storage; and
notifying, upon receiving the notification, the streaming storage system that the data tiering operation is completed.

15. The method of claim 14, wherein the request specifies that the data chunks of the stream need to be tiered to a second long-term storage instead of the first long-term storage.

16. The method of claim 15,
wherein the first long-term storage is a private storage executing in a private environment, and
wherein the second long-term storage is a public storage executing in a public environment.

17. The method of claim 14,
wherein an edge device executes the first function and a cloud device executes the second function,
wherein the cloud device executes the second function because the edge device does not comprise computing resources required to execute the second function,
wherein the edge device, an edge node, and the cloud device form a heterogeneous environment, and
wherein the edge device, the edge node, the cloud device, the first long-term storage, and a second long-term storage are connected to each other over a network.

18. The method of claim 17,
wherein the manager is hosted by the edge device,
wherein a third manager is hosted by the edge node, and
wherein the second manager and the third manager are instances of the manager.

19. The method of claim 18,
wherein the manager, the second manager, and the third manager form a stream tiering proxy, and
wherein the proxy is exposed as a service to the streaming storage system.

20. The method of claim 14, wherein the policy dictates when and how the first function and the second function are allowed to process a set of data chunks of the stream.

* * * * *